United States Patent
Wang et al.

(10) Patent No.: US 10,375,671 B2
(45) Date of Patent: Aug. 6, 2019

(54) PAGING WITH ENHANCED BEAMFORMING

(71) Applicant: Google LLC, Mountain View, CA (US)

(72) Inventors: Jibing Wang, Saratoga, CA (US); Erik Richard Stauffer, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/852,572

(22) Filed: Dec. 22, 2017

(65) Prior Publication Data

US 2019/0200322 A1 Jun. 27, 2019

(51) Int. Cl.
*H04B 7/06* (2006.01)
*H04L 1/18* (2006.01)
(Continued)

(52) U.S. Cl.
CPC .......... *H04W 68/02* (2013.01); *H04B 7/0617* (2013.01); *H04B 7/0695* (2013.01);
(Continued)

(58) Field of Classification Search
CPC ..... H04W 16/28; H04W 68/00; H04W 68/02; H04W 68/005; H04W 68/025; G06F 17/30; H04B 7/04
See application file for complete search history.

(56) References Cited

U.S. PATENT DOCUMENTS 5,543,811 A 8/1996 Chethik
6,711,224 B1 3/2004 Benning et al.
(Continued)

FOREIGN PATENT DOCUMENTS

EP 3081041 10/2016
EP 3105958 12/2016
(Continued)

OTHER PUBLICATIONS

"Dragonfly Narrowband IoT Unveiled with GNSS Option", GPS World Staff; Retrieved from http://gpsworld.com/dragonfly-narrowband-iot-unveiled-with-gnss-option/ on Dec. 7, 2017, Mar. 7, 2017, 5 pages.

(Continued)

*Primary Examiner* — Diane D Mizrahi
(74) *Attorney, Agent, or Firm* — Colby Nipper PLLC

(57) ABSTRACT

The present disclosure describes methods and apparatuses for paging with enhanced beamforming. In example implementations, a base station (BS) transmits at a paging occasion a paging message to multiple end-user devices (EUDs) via a downlink communication with a wide beam. If an EUD fails to obtain the paging message, the EUD selects a frequency sub-band and formulates a paging request with an EUD identifier. The EUD transmits the paging request to the BS via an uplink communication with a narrow beam using the selected frequency sub-band. The BS processes the paging request and formulates a paging response based on the identifier. The BS transmits the paging response via a downlink communication with a narrow beam on the selected frequency sub-band. The BS determines a direction of the narrow beam of the downlink communication based on a direction of the narrow beam of the uplink communication to answer the paging response.

20 Claims, 13 Drawing Sheets

(51) Int. Cl.
*H04W 36/06* (2009.01)
*H04W 36/38* (2009.01)
*H04W 68/02* (2009.01)

(52) U.S. Cl.
CPC ............... *H04L 1/18* (2013.01); *H04W 36/06* (2013.01); *H04W 36/38* (2013.01)

(56) References Cited

U.S. PATENT DOCUMENTS

| | | |
|---|---|---|
| 8,315,185 B2 | 11/2012 | Chan |
| 8,346,286 B2 | 1/2013 | Lee et al. |
| 8,543,063 B2 | 9/2013 | Bergel et al. |
| 8,594,053 B2 | 11/2013 | Kim et al. |
| 8,605,644 B2 | 12/2013 | Wang |
| 8,923,192 B2 | 12/2014 | Gong |
| 9,060,324 B1 | 6/2015 | Goyal et al. |
| 9,204,441 B2 | 12/2015 | Nagaraja et al. |
| 9,258,798 B2 | 2/2016 | Li et al. |
| 9,425,923 B2 | 8/2016 | Ratasuk et al. |
| 9,686,667 B2 | 6/2017 | Artuso |
| 10,080,244 B2 | 9/2018 | Lei et al. |
| 2008/0018427 A1 | 1/2008 | Ezra et al. |
| 2009/0102715 A1 | 4/2009 | Lou et al. |
| 2011/0205981 A1 | 8/2011 | Koo et al. |
| 2012/0039280 A1 | 2/2012 | Chen et al. |
| 2012/0208547 A1 | 8/2012 | Geirhofer et al. |
| 2012/0275384 A1* | 11/2012 | Long ................... H04L 65/1069 370/328 |
| 2013/0301454 A1 | 11/2013 | Seol et al. |
| 2014/0362752 A1 | 12/2014 | Jha et al. |
| 2015/0208458 A1 | 7/2015 | Pelletier et al. |
| 2015/0382205 A1 | 12/2015 | Lee et al. |
| 2016/0029235 A1 | 1/2016 | Kim et al. |
| 2016/0050002 A1 | 2/2016 | Wei et al. |
| 2016/0099763 A1 | 4/2016 | Chen |
| 2016/0127997 A1 | 5/2016 | Ang et al. |
| 2016/0135213 A1 | 5/2016 | Zhu et al. |
| 2016/0234736 A1 | 8/2016 | Kubota et al. |
| 2016/0270027 A1 | 9/2016 | Ang et al. |
| 2016/0286524 A1 | 9/2016 | Griot et al. |
| 2016/0353424 A1 | 12/2016 | Stirling-Gllacher et al. |
| 2017/0134913 A1 | 5/2017 | Cui et al. |
| 2017/0149480 A1 | 5/2017 | Kakishima et al. |
| 2017/0180095 A1 | 6/2017 | Xue et al. |
| 2017/0195031 A1 | 7/2017 | Onggonsanusi et al. |
| 2017/0201982 A1 | 7/2017 | Alvarino et al. |
| 2017/0223744 A1 | 8/2017 | Qian et al. |
| 2017/0257842 A1 | 9/2017 | Hessler et al. |
| 2017/0310417 A1 | 10/2017 | Jung et al. |
| 2017/0331577 A1* | 11/2017 | Parkvall ............... H04J 11/0079 |
| 2017/0331670 A1* | 11/2017 | Parkvall ............... H04J 11/0079 |
| 2017/0347334 A1 | 11/2017 | Akkarakaran et al. |
| 2017/0367069 A1* | 12/2017 | Agiwal ................. H04W 68/02 |
| 2018/0070282 A1 | 3/2018 | Su et al. |
| 2018/0077734 A1 | 3/2018 | Kim et al. |
| 2018/0139014 A1 | 5/2018 | Xiong et al. |
| 2018/0206217 A1 | 7/2018 | Martin et al. |
| 2018/0227902 A1 | 8/2018 | Gholmieh et al. |
| 2018/0279303 A1 | 9/2018 | Sun et al. |
| 2018/0279324 A1 | 9/2018 | Wang et al. |
| 2018/0332605 A1 | 11/2018 | Pelletier |
| 2018/0367230 A1 | 12/2018 | Su et al. |
| 2019/0029005 A1 | 1/2019 | Bendlin et al. |
| 2019/0052419 A1 | 2/2019 | Yang et al. |
| 2019/0141767 A1 | 5/2019 | Wang et al. |

FOREIGN PATENT DOCUMENTS

| | | |
|---|---|---|
| WO | 2013070149 | 5/2013 |
| WO | 2015086215 | 6/2015 |
| WO | 2012074878 | 7/2015 |
| WO | 2016119882 | 8/2016 |
| WO | 2016133106 | 8/2016 |
| WO | 2016204811 | 12/2016 |
| WO | 2017025366 | 2/2017 |
| WO | 2017030601 | 2/2017 |
| WO | 2017083514 | 5/2017 |
| WO | 2017088898 | 6/2017 |
| WO | 2017109549 | 6/2017 |
| WO | 2017111987 | 6/2017 |
| WO | 2017117340 | 7/2017 |
| WO | 2017127126 | 7/2017 |
| WO | 2017146773 | 8/2017 |
| WO | 2017150863 | 9/2017 |
| WO | 2017195463 | 11/2017 |
| WO | 2018031846 | 2/2018 |
| WO | 2018034998 | 2/2018 |
| WO | 2018064068 | 4/2018 |

OTHER PUBLICATIONS

"Leading the LTE IoT Evolution to Connect the Massive Internet of Things", Qualcomm, Inc., Jun. 2017, 41 pages.

"NB-IOT, Accelerating Cellular IOT", Huawei; Roads to MBB 2020; Building a Better Connected World; Global Mobile Broadband Forum 2015; Hong Kong, Nov. 2-5, 2015, 4 pages.

Dutta, et al., "Frame Structure Design and Analysis for Millimeter Wave Cellular Systems", avix.org; NYU Wireless, New York University Tandon School of Engineering, Aug. 20, 2016, 31 pages.

Jantti, "Machine Type Communications for Internet of Things—Recent advances and future possibilities", WNCG; Seminar, Oct. 7, 2016, 1 page.

Landstrom, et al., "NB-IOT: A Sustainable Technology for Connecting Billions of Devices", Ericsson Technology Review; Standardizing Narrowband IoT, Apr. 22, 2016, 12 pages.

Pederson, et al., "A Flexible Frame Structure for 5G Wide Area", Aalborg University, Proceedings of IEEE VTC Fall—2015, 2015, 6 pages.

"3rd Generation Partnership Project", Technical Specification Group Radio Access Network; NR and NG-RAN Overall; 3GPP Standard; Technical Specification; 3GPP TS 38.300, 3rd Generation Partnership Project (3GPP), Mobile Competence Centre, Nov. 17, 2017, 56 pages.

"3rd Generation Partnership Project; Technical Specification Group Radio Access Network", Evolved Universal Terrestrial Radio Access (E-UTRA) and NR; Multi-connectivity; Stage 2 (Release 15); 3GPP Standard; Technical Specification; 3GPP TS 37.340, 3rd Generation Partnership Project (3GPP), Mobile Competence Centre, Nov. 17, 2017, 49 pages.

"International Search Report and Written Opinion", PCT Application No. PCT/US2018/041696, dated Oct. 9, 2018, 30 pages.

"International Search Report and Written Opinion", PCT Application No. PCT/US2018/046004, dated Nov. 22, 2018, 13 pages.

"International Search Report and Written Opinion", PCT Application No. PCT/2018/050487, dated Nov. 26, 2018, 13 pages.

"International Search Report and Written Opinion", PCT Application No. PCT/US2018/049407, dated Dec. 14, 2018, 18 pages.

"Invitation to Pay Additional Fees", PCT Application No. PCT/US2018/049403, dated Nov. 19, 2018, 13 pages.

"Restriction Requirement", U.S. Appl. No. 15/842,318, dated Oct. 4, 2018, 7 pages.

Gineste, et al., "Narrowband IoT Service Provision to 5G User Equipment via a Satellite Component", 2017 IEEE GLOBECOM Workshops, IEEE, Dec. 4, 2017, Dec. 4, 2017, 4 pages.

Thales, et al., "FS_5GSAT, Draft Use Case, Internet of Things with a Satellite Component", 3GPP TSG-SA WG1 Meeting #80, S1-174441, Reno, Nevada, USA, Nov. 27-Dec. 1, 2017, 2017, 2 pages.

"Evolved Universal Terrestrial Radio Access (E-UTRA)", 3rd Generation Partnership Project; Technical Specification Group Radio Access Network; Evolved Universal Terrestrial Radio Access (E-UTRA); Radio Resource Control (RRC); Protocol specification (Release 10), Mar. 2013, 307 pages.

"International Search Report and Written Opinion", PCT Application No. PCT/US2018/049403, dated Jan. 16, 2019, 21 pages.

"International Search Report and Written Opinion", PCT Application No. PCT/US2018/067367, dated Mar. 20, 2019, 19 pages.

(56) References Cited

OTHER PUBLICATIONS

"Invitation to Pay Additional Fees", PCT Application No. PCT/US2018/065557, dated Mar. 13, 2019, 19 pages.
"Invitation to Pay Additional Fees", PCT Application No. PCT/US2018/065829, dated Mar. 15, 2019, 13 pages.
"Non-Final Office Action", U.S. Appl. No. 15/832,395, dated Feb. 27, 2019, 18 pages.
"Non-Final Office Action", U.S. Appl. No. 15/842,241, dated Mar. 11, 2019, 12 pages.
"Pre-Interview Communication", U.S. Appl. No. 15/842,318, dated Mar. 29, 2019, 4 pages.
"First Action Interview Office Action", U.S. Appl. No. 15/842,318, dated May 7, 2019, 3 pages.
"Non-Final Office Action", U.S. Appl. No. 15/939,060, dated May 23, 2019, 15 pages.
"Pre-Interview Communication", U.S. Appl. No. 15/833,312, dated Apr. 19, 2019, 4 pages.

* cited by examiner

PAGING WITH ENHANCED BEAMFORMING

BACKGROUND

Electronic devices play integral roles in manufacturing, healthcare, commerce, social interaction, entertainment, and communication. For example, most people consider their smart phone a critical part of their daily lives. Electronic devices also enable the computer server farms that provide cloud-based, distributed computing functionality for commerce and social interaction. Further, devices with computing power are embedded in many different types of modern equipment, from medical devices to household appliances and from vehicles to industrial tools. Thus, electronic devices are manufactured in a multitude of sizes, form factors, and capabilities for an even greater array of purposes. One particularly prominent purpose for electronic devices is communication, including communication over longer distances.

Prior to the development of electronic devices, long-distance communication was generally limited to the physical transport of a letter by a human being. Other options included sending up smoke signals or recruiting a pigeon to carry a short letter. The former option is limited to short distances and is subject to the whims of the weather, and the latter option has reliability issues that are self-evident. Fortunately, the invention of the telegraph ushered in the age of reliable long-distance communication using electrical signals that encoded the written word using, e.g., a Morse code for each letter. Eventually, telegraph technology was upgraded to telephone technology so that people could simply speak to one another using electrical signals that traversed great distances. Both telegraph and telephone technology, however, require a wire that is extended between both parties to a communication.

The next step in the evolution of communication involved harnessing electromagnetic (EM) waves that travel in free space without using a wire. However, EM waves generally travel in a straight line, so they could not easily cover great distances around a curved earth. One exception to this is shortwave EM signals. Shortwave EM signals still travel in straight lines, but they reflect off a layer of the earth's atmosphere called the ionosphere. Shortwave EM signals can therefore be reflected past the earth's horizon to enable communication across thousands of miles. Unfortunately, communicating with shortwave EM signals typically involves using antennas that are many tens of feet tall. These are expensive and impractical for mobile communication. To enable portability, citizen band (CB) radios and walkie-talkies were developed for mobile use. As early as the 1960s and 1970s, CB radios and walkie-talkies could be produced in a portable or even hand-held form. Unfortunately, communication with either of these portable devices was limited to just a few miles.

By the 1980s, communication using electrical or EM signals was generally divided into using fully-wired technology or fully-wireless technology, especially for consumers and in other low-cost scenarios. For example, telephones enabled long-distance voice communication, but telephone technology was still generally limited to wired connections. Portable radios, on the other hand, used EM waves to establish wireless connections, but voice communications with these consumer-level devices used EM waves that were generally limited to no more than a few miles. To merge these two technologies and achieve some benefits of both, cellular technology was created. Cellular technology can be implemented using a communication network that combines both a wireless network and a wired network. As a result, cellular technology enables mobile electronic devices to be used to make long-distance communications.

With cellular technology, a communication between two people usually has both a wireless portion and a wired portion. A portion of the communication that is near one party is instituted using a wireless connection between a mobile phone and a base station, which is part of a cellular or wireless network of a larger communication network. This wireless connection typically extends from a few feet to a few miles. The communication network also includes or is coupled to a wired network. The base station can therefore continue the communication using a wired connection over the wired network. The wired network can extend from hundreds of feet to thousands of miles. If the other party is also using a mobile phone, the communication can be converted back to another wireless portion and routed to the other party using another wireless connection.

To enable cellular technology to work across a wide geographic region, many base stations are distributed across the region to enable a wireless portion of a communication to be established at different locations. Each of these base stations is typically able to support multiple users by simultaneously establishing multiple wireless connections with respective ones of multiple mobile phones. Thus, by the 1990s, cellular technology enabled voice calls to be made using a communication that included both a wireless connection and a wired connection. To expand the ability to communicate with more than voice using cellular technology, cellular systems were augmented to include an ability to communicate textually. Such communication used text messages, which were called short message service (SMS) messages. This continued efforts to enable mobile phones and other electronic devices to send and receive data, as well as exchange voice communications.

Communication of data, in addition to voice, became feasible with the development of Second Generation (2G) wireless networks. Data communication was not meaningful for most purposes, however, until Third Generation (3G) wireless networks were deployed. 3G wireless networks enabled mobile phone users to send and receive simple emails and access basic web pages without experiencing lengthy delays. However, Fourth Generation (4G) networks, such as those based on a Long-Term Evolution (LTE) standard, truly enabled the data-based wireless services that users enjoy today. For example, with a smart phone operating on a 4G network, a user can now make video calls in addition to voice calls. Additionally, users can surf the web without appreciable constraints and can receive real-time, turn-by-turn navigational directions. Further, users can stay up-to-date on social media postings, upload their own images or even videos, and watch high-definition video, all while on-the-go.

To accommodate these existing services, wireless networks are already expected to handle immense quantities of data with little to no appreciable delays. However, newer services are primed to demand even more from cellular wireless networks. Users will expect greater data bandwidth and even less delay, called latency, to accommodate such services. These new services include high-bandwidth applications like ultra-high definition (UHD) video that is delivered wirelessly from a streaming video service to a mobile device. Such services also include low-latency applications like autonomous-driving vehicles that communicate with each other to avoid accidents and that can therefore operate more safely if provided nearly instantaneous data communication capabilities. Some applications, like virtual reality (VR), will demand data delivery that provides a combination of both high-bandwidth and low-latency. Further, there is the ongoing development of the Internet of Things (IoT), which involves providing wireless communication capabilities to everything from medical devices to security hardware and from refrigerators to speakers. The deployment of IoT devices means hundreds of billions to trillions of new devices will soon be trying to communicate wirelessly.

Current 4G wireless networks are not expected to be able to handle the data bandwidth and latency specifications for these new applications. Accordingly, to enjoy these new applications, new wireless technology is being developed. This Fifth Generation (5G) wireless network technology will adopt higher frequency EM waves (e.g., 6 GHz to 100 GHz for millimeter wave (mmW) wireless connections) to attain higher data bandwidth in conjunction with lower latency. These new applications and higher EM frequencies, however, introduce new and different challenges that are yet to be overcome.

For example, with the multitude of IoT devices that are coming on-line, the EM spectrum that is allocated to cellular wireless usage will be shared among many more wireless connection endpoints. Also, with the mmW EM signaling that will be used in some wireless networks, including 5G cellular networks, wireless signals are attenuated more quickly. More specifically, mmW EM signals are attenuated more quickly by air molecules and other environmental factors, such as humidity or physical obstructions, as compared to those signaling frequencies used in earlier generations of wireless networks. Consequently, mmW EM signals are incapable of traveling as far through the atmosphere before a quality thereof is reduced to a level at which the information in the wireless signal is lost or otherwise becomes unusable. To address these issues, engineers and manufacturers are striving to create new wireless signaling technologies that can enable utilization of these GHz frequencies in a cellular wireless network, including those operating in accordance with a 5G wireless network standard.

This background description is provided to generally present the context of the disclosure. Unless otherwise indicated herein, material described in this section is neither expressly nor impliedly admitted to be prior art to the present disclosure or the appended claims.

SUMMARY

Techniques and apparatuses are described for paging with enhanced beamforming. These techniques and apparatuses enable wireless communications to be made more efficiently or in environments that are hostile to signal propagation. A respective beamforming enhancement module at both a base station and an end-user device can interoperate to facilitate the delivery of paging information from the base station to the end-user device. The base station transmits at a paging occasion a paging message to multiple end-user devices via a downlink communication with a wide beam. If an end-user device cannot obtain the paging message, the end-user device can transmit a paging request to the base station via an uplink communication with a narrow beam. The base station can answer with a paging response transmitted via a downlink communication with a reciprocal narrow beam, with the paging response indicative of whether a page exists for the requesting end-user device.

Aspects described below include a method for paging with enhanced beamforming as performed by an end-user device. The method comprises attempting to obtain a paging message transmitted by a base station via a downlink communication with a wide beam. The method also comprises transmitting, based on the attempting, a paging request to the base station via an uplink communication with a narrow beam, with the paging request configured to inquire whether a page exists for the end-user device.

Aspects described below also include an electronic device for implementing paging with enhanced beamforming in a wireless system. The electronic device comprises one or more processors and one or more computer-readable storage media storing modules that are executable by the one or more processors. The computer-readable storage media include an identifier of the electronic device and a paging message module configured to attempt to obtain a paging message transmitted in a downlink region of an air interface resource. The computer-readable storage media also includes a paging request module configured to transmit a paging request in an uplink region of the air interface resource responsive to a failure to obtain at least one paging message, with the paging request including the identifier and comprising an inquiry as to whether a page exists for the electronic device.

Aspects described below additionally include a method for paging with enhanced beamforming as performed by a base station. The method comprises receiving, from an end-user device, a paging request via an uplink communication with a narrow beam, with the paging request configured to inquire whether a page exists for the end-user device. The method also comprises transmitting, to the end user device based on the paging request, a paging response via a downlink communication, with the paging response indicative of whether a page exists for the end user device.

Aspects described below further include a system for paging with enhanced beamforming. The system comprises a paging message module configured to attempt to obtain a paging message transmitted in a downlink region of an air interface resource. The system also comprises means for transmitting a paging request in an uplink region of the air interface resource responsive to a failure to obtain at least one paging message, with the paging request including an identifier of the system and indicative of an inquiry as to whether a page exists for the system.

BRIEF DESCRIPTION OF THE DRAWINGS

Apparatuses of and techniques for implementing paging with enhanced beamforming are described with reference to the following drawings. The same numbers are used throughout the drawings to reference like features and components.

DETAILED DESCRIPTION

Overview

Figure 1:
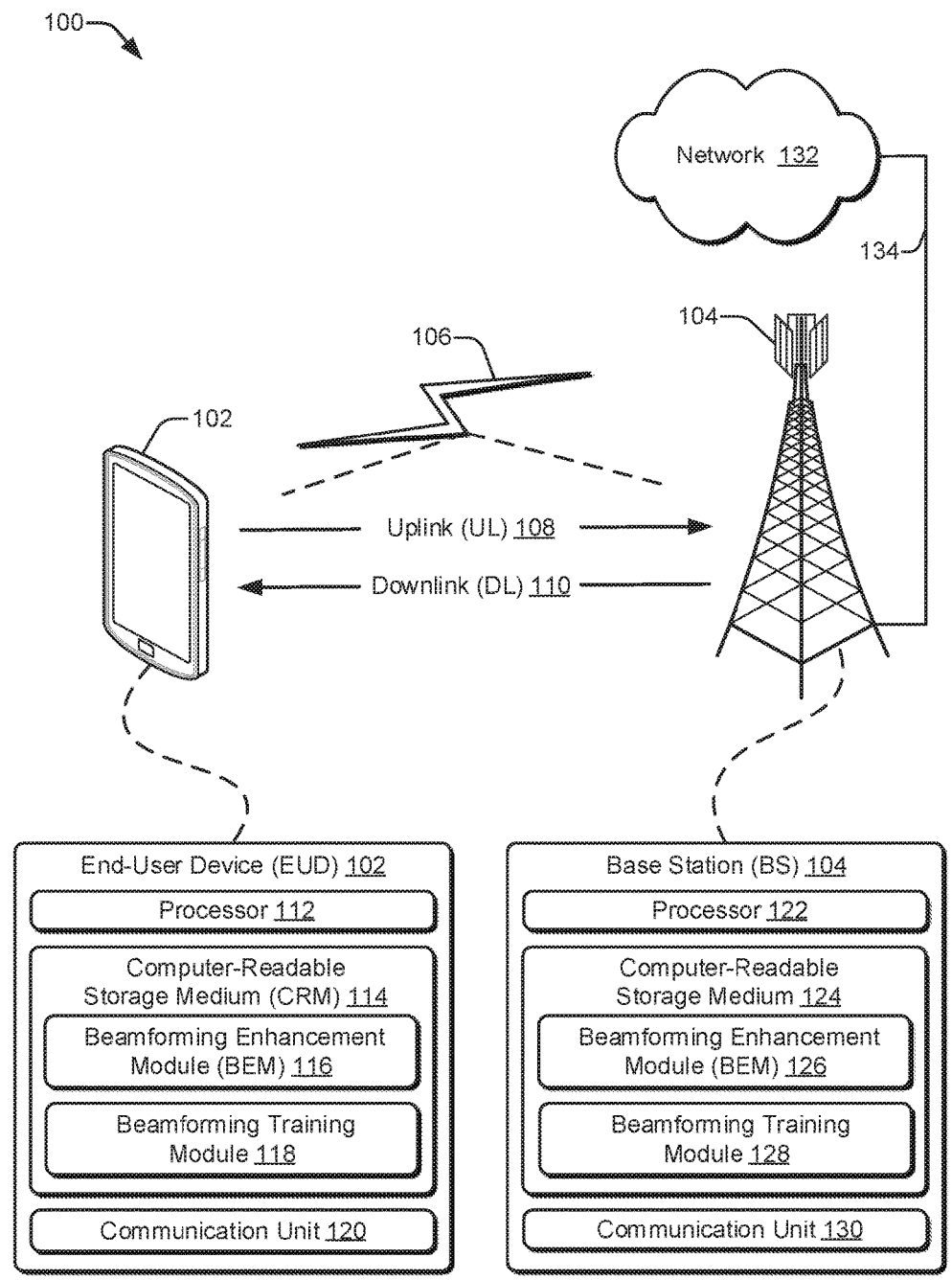
FIG. 1 illustrates an example environment, including an end-user device and a base station, in which paging with enhanced beamforming can be implemented.

The ability to enjoy different types of digital content, services, and other applications over a wireless connection continues to change for the better. Today, users can watch HD video, monitor social network feeds, and participate in video conferences using cellular wireless networks that operate in accordance with a 4G standard, such as LTE or LTE-Advanced. In the near future, cellular wireless networks will be asked to handle newer applications that are technically more difficult to provide to end users. Such applications may include watching ultra-HD (UHD) video or wirelessly coupling hundreds of billions more communication endpoints to the internet to support IoT devices. Such applications may also include providing a safer sharing of the roadways by self-driving vehicles or an exchanging of three-dimensional (3D) VR data for games and educational activities. To enable these newer applications, current cellular wireless networks are expected to be upgraded from 4G technology.

To upgrade from current 4G wireless networks, a destination or goal has been established for next-generation 5G networks. This destination involves adopting for wireless signaling in 5G networks higher EM frequencies than are used in 4G networks. For example, instead of operating in the 100s of MHz to a few GHz like in 4G networks, 5G networks are expected to operate in the 10s of GHz (e.g., from 6 GHz to 100 GHz for mmW signaling). These higher frequencies offer some advantages, such as the potential for greater communication bandwidth in conjunction with lower latency. However, there are many challenges to working with these higher frequencies, and some of these challenges have yet to be met by the telecommunications industry. In other words, although a high-frequency goal has been established for 5G networks, the path to reach this high-frequency destination with an efficient, feasible 5G wireless network has not yet been discovered.

Several examples of the existing challenges for attaining a workable, high-frequency wireless 5G network are set forth here. For example, with the frequencies to be used for mmW signaling for 5G wireless networks, signal strength rapidly attenuates, or reduces, as an EM signal travels through the earth's atmosphere, especially in wet weather. Consequently, the potential distance between a transmitter and a receiver is reduced for mmW signals. As another example, at some of these higher frequencies, emanation of EM signals in proximity to, and in a direction of, skin is to be avoided for extended periods. To at least partially address both these issues, antenna beamforming can be implemented.

With antenna beamforming, a signal is emanated from an antenna array in a particular direction or in a particular pattern instead of equally in all directions from a single antenna. This enables the resulting signal beam to be directed away from skin to accommodate any relevant specific absorption rate (SAR) guidelines instituted for health reasons. Moreover, the emanated power can be concentrated in a specific direction that extends from a transmitter in a direction that aims toward a receiver. Consequently, a signal that is transmitted at a given power level can travel farther through the air on a signal beam, even at the higher frequencies of mmW signals that attenuate more quickly in the earth's atmosphere.

Antenna beamforming offers another advantage: an increased or more-efficient sharing of the EM spectrum. By concentrating a first signal that is sent from a first transmitter to a first receiver in one direction, the first signal is less likely to cause interference in other directions. As a result, a second signal on the same frequency can be reused by a second transmitter and a second receiver in a spatial area that is close to that of the first transmitter and receiver. This spatially-based frequency-reuse technique enables more devices to communicate wirelessly in a given geographic region using some allocated frequency range.

Antenna beamforming can therefore offer a number of advantages, including some that pertain especially to wireless communication with the mmW signals that are earmarked for 5G wireless networks. However, wireless communication with beamforming is more complicated than wireless communication without it. Without antenna beamforming, a transmitter merely emanates an EM signal omni-directionally. With antenna beamforming, on the other hand, a transmitter has to determine a direction at which to aim a beam of a signal. The determination of an appropriate direction is called training the antenna beamforming. This training can be accomplished in different manners, but each manner occupies some period of time and consumes some amount of resources at the transmitting device and/or at the receiving device. If the time period is too long, the antenna beamforming can produce a signal latency that slows a communication. Further, while a transmitting or a receiving device is training the beamforming, the device's processor and RF resources, as well as power resources, are being consumed. This resource consumption can, for example, shorten battery life at a mobile phone or limit how many mobile phones a base station can service at any given time.

Thus, although antenna beamforming is beneficial in some ways, beamforming can also create issues, such as those pertaining to beamform training. Further, with a cellular wireless system that is built on directional wireless signaling, there can be problems with communications that are intended to reach multiple end-user devices. An example of such a communication is paging. A paging message is sent from the wireless network infrastructure, such as from a base station, to a user equipment (UE) to get the UE's attention if new information is to be communicated to the UE. In such situations, the base station typically employs a wide beam that is intended to cover a greater geospatial region to simultaneously communicate with multiple UEs. However, because mmW signals are more susceptible to interruption due to obstacles and attenuation effects, and are therefore less predictable, all the intended UEs may not receive a paging message. If a UE does not receive a paging message, information that is supposed to be provided to the end user thereof can be delayed, or even fail to be delivered.

To ameliorate the risks of paging messages being undelivered to UEs, schemes and techniques described herein provide additional opportunities for a UE to obtain paging information with shorter delays than might otherwise occur. To do so, conventional paging is transformed from an omnidirectional or wide beam, unilateral communication procedure that is limited to communications from a base station to UEs into a directed or narrow beam, bilateral communication procedure. With a bilateral communication procedure, a UE can interrogate a base station about a potential page. For example, if a UE is unable to obtain information included in a paging message at a scheduled paging occasion, the UE is empowered to contact the base station to inquire if a page is waiting for the UE. Furthermore, a paging request-paging response exchange between a requesting UE and a base station can be made using narrow beam wireless communications.

For a given wireless network, an end-user device can realize some implementations that are described herein, and a base station can realize other implementations that are described herein. In example schemes, a base station transmits on the downlink a paging message to multiple end-user devices using a wide beam at a scheduled paging occasion. The paging message notifies end-user devices if a page exists for them. If an end-user device cannot receive or cannot decode the paging message, the end-user device has failed to obtain the paging message. Accordingly, the end-user device selects a frequency sub-band and formulates a paging request with an identifier of the end-user device. The end-user device transmits the paging request to the base station via an uplink communication with a narrow beam using the selected frequency sub-band.

The base station receives the paging request via the uplink communication on the narrow beam. The base station processes the paging request and formulates a paging response based on the end-user device identifier. Thus, the paging response can indicate whether a page exists for the requesting end-user device. To communicate this indication, the base station transmits the paging response via a downlink communication with another narrow beam on the selected frequency sub-band. The base station determines a reciprocal direction of the other narrow beam of the downlink communication based on a direction of the narrow beam of the uplink communication. This increases a likelihood of returning the paging response to the requesting end-user device while also training respective beamformers at the two devices. The end-user device receives the paging response and can process the paging response based on whether a page exists for the end-user device.

By adopting the example implementations described herein, the unpredictability of mmW signaling and the narrow geospatial coverage of some wireless signal beams can be overcome. Moreover, antenna beamforming can be used to reduce the impact of any additional signaling introduced by the described implementations. In these manners, the likelihood of an end-user device learning of a page in a timely manner is appreciably increased for future 5G wireless networks as well as other systems that may use mmW signaling.

Example implementations in various levels of detail are discussed below with reference to the associated figures. The discussion below first sets forth an example operating environment and then describes example schemes, techniques, and hardware. Example methods are described next with reference to various flow diagrams, and the discussion then concludes with an example electronic device and aspects related thereto.

Example Environment

FIG. 1 illustrates an example operating environment 100 in which an electronic device can realize implementations of paging with enhanced beamforming. In this example, the operating environment 100 includes an end-user device 102 (EUD) and a base station 104 (BS) that are respectively configured to communicate over a wireless link 106 of a wireless network. Generally, the wireless link 106 can include an uplink 108 by which the end-user device 102 transmits data or control information to the base station 104 and a downlink 110 by which the base station 104 transmits data or control information to the end-user device 102. The wireless link 106 may be implemented in accordance with at least one suitable protocol or standard, such as a Global System for Mobile Communications (GSM) standard, a Worldwide Interoperability for Microwave Access (Wi-MAX) standard, a High Speed Packet Access (HSPA) protocol, an Evolved HSPA (HSPA+) protocol, a Long-Term Evolution (LTE) standard (e.g., 4G), an LTE Advanced (LTE-A) standard, a Fifth Generation wireless network (5G) standard, any standard promulgated or supported by the 3rd Generation Partnership Project (3GPP), and so forth. Although the wireless link 106 is shown or described with reference to a separate uplink 108 or downlink 110, various types of communications between the end-user device 102 and the base station 104 may also be referred to as a wireless communication, a wireless connection, a wireless association, a frame exchange, a communication link, or the like.

In example implementations, the end-user device 102 includes at least one processor 112, one or more computer-readable storage media 114, and at least one communication unit 120. The end-user device 102 is depicted as a smart phone. However, the end-user device 102 may instead be implemented as any device with wireless communication capabilities, such as a mobile gaming console, a tablet, a laptop, an Advanced Driver Assistance System (ADAS), a point-of-sale (POS) terminal, a health monitoring device, a drone, a vehicle, a camera, a media-streaming dongle, a wearable smart-device, an Internet-of-Things (IoT) device, a personal media device, a navigation device, a mobile-internet device (MID), a wireless hotspot, a femtocell, a broadband router, a mobile station, a user equipment (UE), or some combination thereof. The computer-readable storage media 114 can include a beamforming enhancement module 116 (BEM) and a beamforming training module 118, which are described below.

The processor 112 of the end-user device 102 can execute processor-executable instructions or code stored by the computer-readable storage medium 114 (CRM) to cause the end-user device 102 to perform operations or implement various device functionalities. In some cases, the processor 112 is implemented as a general-purpose processor (e.g., a multicore central-processing unit (CPU)), an application-specific integrated circuit (ASIC), or a system-on-chip (SoC) with other components of the end-user device integrated therein. The CRM 114 may include any suitable type of memory media or storage media, such as read-only memory (ROM), programmable ROM (PROM), random access memory (RAM), dynamic RAM (DRAM), static RAM (SRAM), or Flash memory. In the context of this discussion, the CRM 114 of the end-user device 102 is implemented as at least one hardware-based storage medium, which does not include transitory signals or carrier waves. In some cases, the CRM 114 stores firmware, an operating system, and/or applications of the end-user device 102 as instructions, code, or other information. The instructions or code can be executed by the processor 112 to implement various functionalities of the end-user device 102, such as those related to beamforming, beamforming training, resource utilization, paging, network access, and so forth. In this example, the CRM 114 stores processor-executable instructions or code to implement the beamforming enhancement module 116 or the beamforming training module 118 of the end-user device 102.

The communication unit 120 of the end-user device 102 can include an antenna, a receiver, a transmitter, a baseband processor, and associated circuitry or other components (not shown) for communicating with the base station 104 via a wireless signal propagation medium (e.g., the air). For example, the communication unit 120 may transmit, via the transmitter, data or control information to the base station 104 via the uplink 108. This data or control information that is transmitted to the base station 104 may include any suitable type of framed or packetized information, such as device status information, wireless link status information, wireless link control information, data requests, data, network access requests, indications of channel quality, and so forth. The communication unit 120 may also receive, via the receiver, data or control information from the base station 104, such as wireless link configuration settings, network control information, resource grants, data traffic, and so forth.

In FIG. 1, the base station 104 is depicted generally as a cellular base station of a wireless network (not separately indicated). Using a wireless network, the base station 104 may enable or provide access to other networks or resources, such as the network 132 (e.g., the Internet) that is connected via a wired network interface portion of a communication unit 130 and a backhaul link 134 (e.g., a fiber network). The base station 104 may be implemented to realize or manage at least one cell of a wireless network that includes multiple other base stations that each realize other respective cells of the wireless network. As such, the base station 104 may communicate with a network management entity or other base stations to coordinate connectivity or hand-offs of end-user devices within or across the cells of the wireless network. The base station 104 can be configured as any suitable type of base station or network management node, such as a Global System for Mobile Communications (GSM) base station, a node base (Node B) transceiver station (e.g., for UMTS), an evolved NodeB (eNB, e.g., for LTE), a next generation Node B (gNB, e.g., for 5G), and so forth. As such, the base station 104 may control or configure parameters of the uplink 108 or the downlink 110 in accordance with one or more of the wireless standards or protocols identified herein.

In example implementations, the base station 104 includes at least one processor 122, one or more computer-readable storage media 124, and at least one communication unit 130. The processor 122 can execute processor-executable instructions or code stored by the computer-readable storage medium 124 (CRM) to perform operations or implement various base station functionalities. In some cases, the processor 122 is implemented as multiple processor cores or a multicore processor configured to execute firmware or an operating system of the base station 104, as well as any applications thereof. The CRM 124 may include any suitable type of memory media or storage media, such as ROM, PROM, RAM, DRAM, SRAM, or Flash memory. In the context of this discussion, the CRM 124 is implemented as at least one hardware-based storage medium, which does not include transitory signals or carrier waves. The CRM 124 of the base station 104 may store firmware, an operating system, or applications of the base station as instructions, code, or other information. The instructions or code can be executed by the processor 122 to implement various functionalities of the base station 104, such as to manage connectivity or parameters of the wireless link 106 with the end-user device 102 or providing paging notifications to the end-user device 102. In this example, the CRM 124 also stores processor-executable instructions or code for implementing the beamforming enhancement module 126 and the beamforming training module 128 of the base station 104.

In some aspects, a resource manager (not shown) of the base station 104 can be implemented to perform various functions associated with allocating physical access resource units (e.g., resource blocks or resource elements) or communication resources available to the base station 104. The physical access resources, such as an air interface resource available to the base station 104, may be partitioned or divided into various resource units (e.g., frames or blocks) of bandwidth, time spans, carriers or frequency bands, symbols, or the like. For example, within a framework of an LTE standard, the resource manager can allocate frequency spectrum and time intervals of access in resource blocks, each of which can be allocated in whole or in part, to one or more end-user devices communicating with the base station 104.

The resource manager can also communicate, to the end-user device 102, an identification of the allocated resource units for a communication via the uplink 108 or the downlink 110. The identification may include one or both of frequency bands or temporal locations of respective resource blocks or elements of the allocated resource units. The frequency bands or temporal locations may be effective to enable the end-user device 102 to communicate in a mode or manner as described herein via the allocated resource units. In such instances, each indication of the allocated resource units may be communicated from the base station 104 to the end-user device 102 as, e.g., part of a Radio Resource Control (RRC) message or a Downlink Control Information (DCI) message.

The communication unit 130 of the base station 104 can include an antenna, a receiver, a transmitter, a baseband processor, and associated circuitry or other components (not shown) for communicating with the end-user device 102 via the wireless signal propagation medium. In some cases, the communication unit 130 includes or is coupled with multiple transceivers and antenna arrays that are configured to establish and manage multiple wireless links with respective ones of multiple end-user devices (e.g., in accordance with a massive multiple-input and multiple-output (MIMO) implementation). The base station 104 may communicate any suitable data or control information to the end-user device 102 (or other devices) through the downlink 110, such as a schedule of allocated resource units, data traffic, wireless link status information, wireless link control information, paging information, and so forth.

Figure 2:
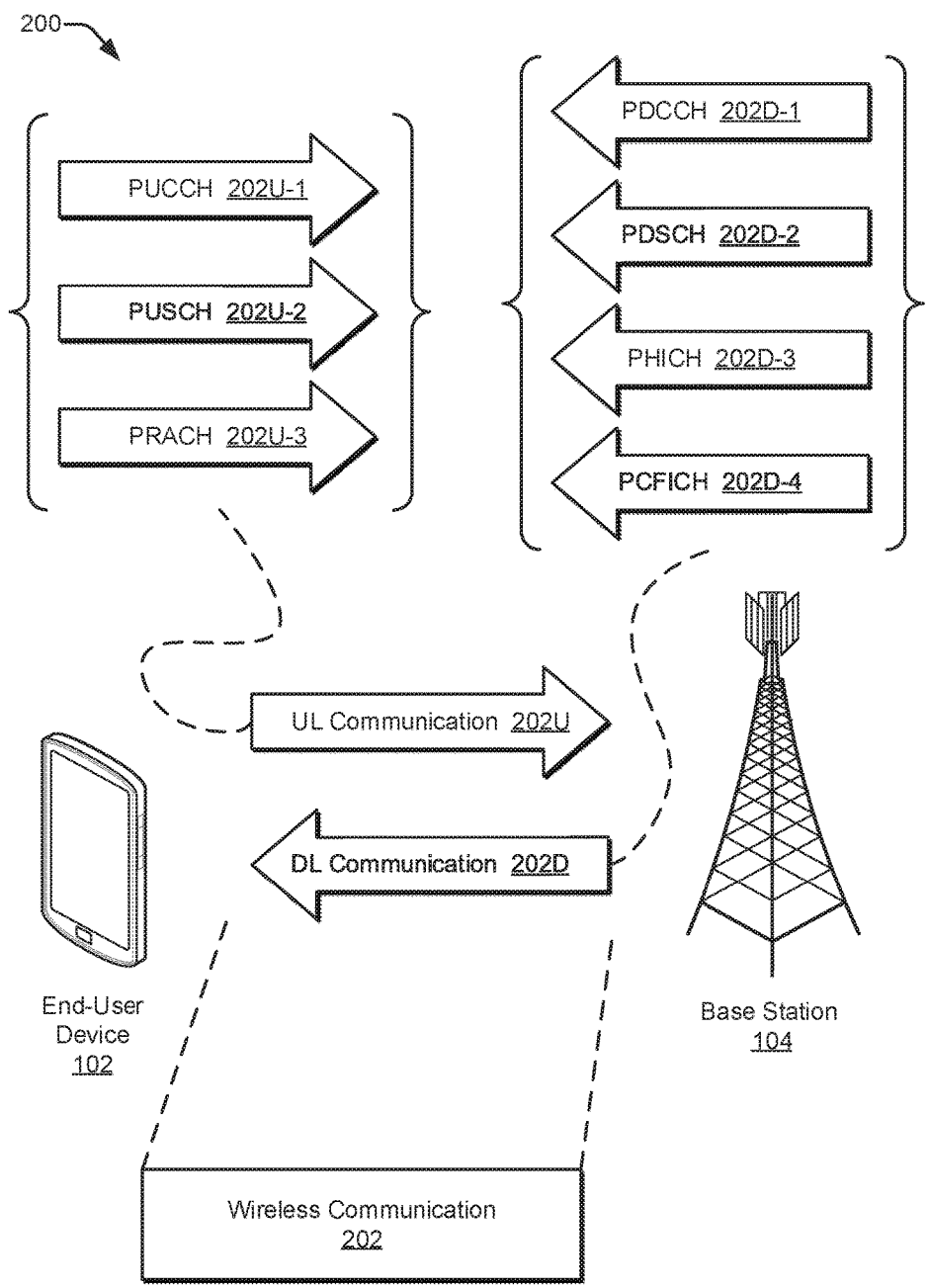
FIG. 2 illustrates other aspects of an example environment in which paging with enhanced beamforming can be implemented.

FIG. 2 illustrates an example wireless system 200 in which an end-user device 102 and a base station 104 may communicate in accordance with one or more aspects described herein. The wireless system 200 includes respective instances of the end-user device 102 and the base station 104. The base station 104 provides or realizes a portion of a wireless network with which the end-user device 102 may associate to enable a wireless communication 202 to be exchanged. The wireless system 200 may include other base stations, a network management entity, and so forth (not shown) to provide a wireless wide area network (WAN), such as an LTE network or a 5G network offering associated data services.

The end-user device 102 and/or the base station 104 may communicate through any suitable type or combination of channels, message exchanges, or network management procedures using at least one wireless communication 202. As shown, each wireless communication 202 can include an UL communication 202U from the end-user device 102 to the base station 104 or a DL communication 202D from the base station 104 to the end-user device 102 (or both—e.g., an UL/DL pair). The UL communication 202U can include an uplink data channel and/or an uplink control channel, a few examples of which are depicted in the top left of FIG. 2. Similarly, the DL communication 202D can include a downlink data channel and/or a downlink control channel, a few examples of which are depicted in the top right. Alternatively, a wireless communication 202 can include both a DL communication 202D and an UL communication 202U. Further, the UL and DL communications of a wireless communication 202 can be related, such as by being exchanged between the same two electronic devices, by being adjacent to each other, by pertaining to the same information, and so forth.

The wireless system 200 can be implemented to comport with any of one or more different wireless standards or protocols. Example implementations that may comport with an LTE standard are described with reference to FIG. 2. In this example, the end-user device 102 can transmit control information to the base station 104 via a physical uplink control channel 202U-1 (PUCCH). The PUCCH 202U-1 may be used to transmit, to the base station 104, one or more of hybrid automatic repeat request (HARQ) messages, acknowledge/not acknowledge (ACK/NACK) messages, channel quality indicators (CQI), multiple-input-multiple-output (MIMO) feedback such as a rank indicator (RI) or a precoding matrix indicator (PMI), and scheduling requests for an uplink data transmission. The end-user device 102 can transmit using, for instance, a binary phase-shift keying (BPSK) modulation or a quadrature phase-shift keying (QPSK) modulation for the PUCCH modulation.

The end-user device 102 may send data to the base station 104 via a physical uplink shared channel (PUSCH) 202U-2. The PUSCH 202U-2 can include radio resource control (RRC) communications, uplink control information (UCI) messages, application data, and so forth. The PUSCH 202U-2 is typically the channel on which the end-user device 102 transmits application data to the base station 104. Another example channel of an UL communication 202U is the physical random-access channel (PRACH) 202U-3. With the PRACH 202U-3, the end-user device 102 can make a non-synchronized transmission to the base station 104.

The base station 104 can transmit control information to the end-user device 102 via a physical downlink control channel (PDCCH) 202D-1. The PDCCH 202D-1 can be used by the base station 104 to communicate Downlink Control Information (DCI) and/or Radio Resource Control (RRC) information to the end-user device 102. In some scenarios, the DCI includes identification of resource units (e.g., resource blocks or resource elements) to be used for communication of data to the end-user device 102. The DCI may also include a modulation scheme and coding/decoding information for the end-user device 102 to access the data communicated to the end-user device 102.

The base station 104 may send data to the end-user device 102 via a physical downlink shared channel (PDSCH) 202D-2. Thus, the PDSCH 202D-2 is typically the channel on which the base station 104 transmits application data to the end-user device 102. Alternatively or additionally, the base station 104 may send information to the end-user device 102 via a physical HARQ indicator channel (PHICH) 202D-3. The PHICH 202D-3 can include acknowledgements (ACKs) or no-acknowledgements (NACKs) for data received from the end-user device 102 via the PUSCH 202U-2. Another example channel of a DL communication 202D is the physical control format indicator channel (PCFICH) 202D-4. With the PCFICH 202D-4, the base station 104 can inform the end-user device 102 of the format of a signal being received.

The terminology used with reference to FIG. 2 for example UL communications 202U and DL communications 202D relate at least to an LTE standard. However, as used herein, these particular channels and other standard-specific terms (e.g., sounding reference signal (SRS) or downlink control indicator (DCI)), the corresponding underlying concepts, and analogous technologies are not limited to wireless systems or devices that comport with a 4G standard. Instead, these terms may be used as a shorthand to refer to the underlying physical principles or analogous general wireless system technologies. Furthermore, implementations that are described herein can additionally or alternatively pertain to other wireless standards, specifications, and technologies, including other existing and future standards affiliated with the 3GPP (e.g., 5G NR) or IEEE (e.g., 802.11ad).

Figure 3:
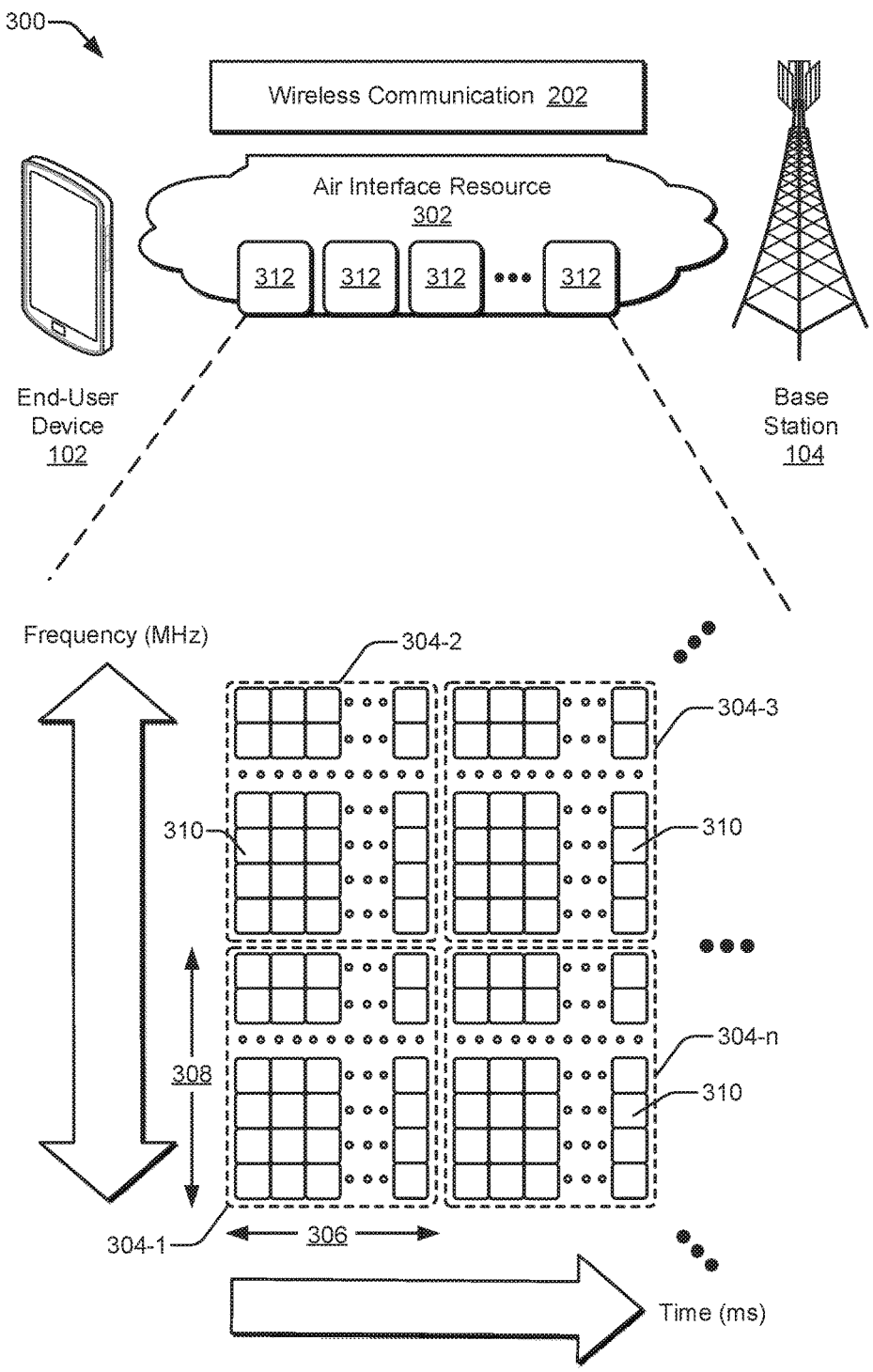
FIG. 3 illustrates an example of an air interface resource that extends between an end-user device and a base station and that can be utilized for paging with enhanced beamforming.

FIG. 3 illustrates an example of an air interface resource 302 extending between an end-user device 102 and a base station 104. The air interface resource 302 can be utilized to enhance antenna beamforming in the context of paging communications as described herein. The air interface resource 302 can be divided into resource units 312, each of which occupies some intersection of frequency spectrum and elapsed time. A portion of the air interface resource 302 is illustrated graphically in a grid or matrix having multiple resource blocks 304, including resource blocks 304-1, 304-2, 304-3 . . . 304-n, with "n" representing some positive integer. An example of a resource unit 312 therefore includes at least one resource block 304. As shown, time is depicted along the horizontal dimension as the abscissa axis, and frequency is depicted along the vertical dimension as the ordinate axis. The air interface resource 302, as defined by a given communication protocol or standard, may span any suitable specified frequency range and/or may be divided into intervals of any specified duration. Increments of time can correspond to, for example, milliseconds (ms). Increments of frequency can correspond to, for example, megahertz (MHz).

In example operations generally, the base station 104 allocates portions (e.g., resource units 312) of the air interface resource 302 for UL and DL wireless communications 202U and 202D. Each resource block 304 of network access resources may be allocated to support respective wireless communications 202 of multiple end-user devices 102. In the lower left corner of the grid, the resource block 304-1 may span, as defined by a given communication protocol, a specified frequency range 308 and comprise multiple subcarriers or frequency sub-bands. The resource block 304-1 may include any suitable number of subcarriers (e.g., 12) that each correspond to a respective portion (e.g., 15 kHz) of the specified frequency range 308 (e.g., 180 kHz). The resource block 304-1 may also span, as defined by the given communication protocol, a specified time interval 306 or time slot (e.g., lasting approximately one-half millisecond or 7 orthogonal frequency-division multiplexing (OFDM) symbols). The time interval 306 includes subintervals that may each correspond to a symbol, such as an OFDM symbol. As shown in FIG. 3, each resource block 304 may include multiple resource elements 310 (REs) that correspond to, or are defined by, a subcarrier of the frequency range 308 and a subinterval (or symbol) of the time interval 306. Alternatively, a given resource element 310 may span more than one frequency subcarrier or symbol. Thus, a resource unit 312 may include at least one resource block 304, at least one resource element 310, and so forth.

In example implementations, multiple end-user devices 102 (one of which is shown) are communicating with the base station 102 through access provided by portions of the air interface resource 302. A resource manager (not shown in FIG. 3) may determine a respective type or amount of information (e.g., data or control information) to be communicated (e.g., transmitted) by the end-user device 102. For example, the resource manager can determine that each end-user device 102 is to transmit a different respective amount of information. The resource manager then allocates one or more resource blocks 304 to each end-user device 102 based on the determined amount of information.

Additionally or in the alternative to block-level resource grants, the resource manager may allocate resource units at an element-level. Thus, the resource manager may allocate one or more resource elements 310 or individual subcarriers to different end-user devices 102. By so doing, one resource block 304 can be allocated to facilitate network access for multiple end-user devices 102. Accordingly, the resource manager may allocate, at various granularities, one or up to all subcarriers or resource elements 310 of a resource block 304 to one end-user device 102 or divided across multiple end-user devices 102, thereby enabling higher network utilization or increased spectrum efficiency. The air interface resource 302 can also be used to exchange paging communications, which are described below starting at FIG. 5.

The resource manager can therefore allocate air interface resource 302 by resource unit 312, resource block 304, frequency carrier, time interval, resource element 310, frequency subcarrier, time subinterval, symbol, spreading code, some combination thereof, and so forth. Based on respective allocations of resource units 312, the resource manager can transmit respective messages to the end-user devices 102 indicating the respective allocation of resource units 312 to each device. Each message may enable a respective end-user device 102 to queue the information or configure a communication unit 120 to communicate via the allocated resource units 312 of the air interface resource 302. For example, an end-user device 102 can prepare an antenna beamformer to steer a signal beam back to the base station 104. To do so, the end-user device 102 can train the beamformer responsive to receipt of a signal transmitted from the base station 104.

Figure 4:
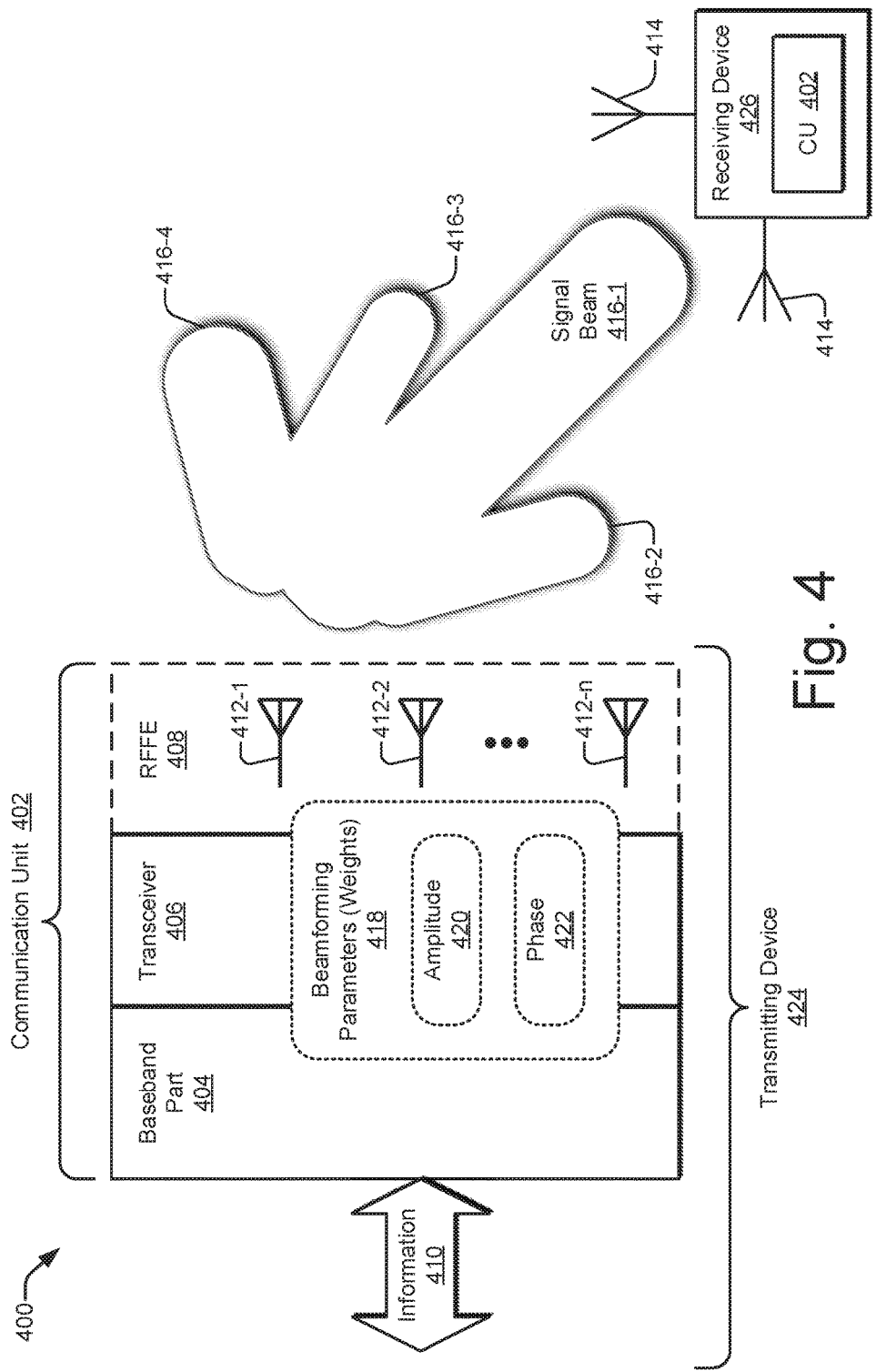
FIG. 4 illustrates an example of a communication unit that is configured to implement beamforming to generate signal beams.

FIG. 4 illustrates an example beamforming scenario 400 including a transmitting device 424 and a receiving device 426. The transmitting device 424 includes an example of a communication unit 402 that is configured to implement antenna beamforming to generate multiple signal beams 416. As shown, the communication unit 402 is transmitting four signal beams 416-1, 416-2, 416-3, and 416-4; however, more or fewer signal beams 416 can be generated. The multiple signal beams 416 are formed such that a first signal beam 416-1 extends farther than the other signal beams. Additionally, the communication unit 402 aims the first signal beam 416-1 in a direction toward the receiving device 426.

In some situations, an end-user device 102 (e.g., of FIGS. 1-3) functions as the transmitting device 424, and a base station 104 functions as the receiving device 426. In other situations, the base station 104 functions as the transmitting device 424, and the end-user device 102 functions as the receiving device 426. Thus, in the former situations, the communication unit 402 of the transmitting device 424 corresponds to a communication unit 120 of the end-user device 102, but the communication unit 402 of the transmitting device 424 corresponds to a communication unit 130 of the base station 104 in the latter situations.

The communication unit 402 is configured to transmit information 410 (e.g., data or control information) or receive information 410. The communication unit 402 includes a baseband (BB) part 404, a transceiver 406 (e.g., a transmitter or a receiver), and an RF front end (RFFE) 408. The RFFE 408 includes multiple antennas 412-1, 412-2 . . . 412-$n$, with "n" representing some positive integer. The multiple antennas 412 may jointly form an antenna array or each antenna 412 may include multiple antenna elements that function as an array. An RF signal that is transmitted from different ones of the multiple antennas 412 constructively and destructively combine at different physical or geospatial locations to create multiple signal beams 416 that provide different spatial patterns for the resulting signal beams 416. In addition to direction, each signal beam 416 can have a different height, shape along the beam, width, shape of incidence on the earth's surface, length, and so forth.

Typically, the baseband part 404 includes at least one baseband processor to modulate or apply the information 410 to a baseband signal. The transceiver 406 includes one or more lowpass filters and processes the baseband signal to upconvert or down-convert the frequency using at least one mixer. The RFFE 408, in addition to the multiple antennas 412, includes one or more bandpass filters. The RFFE 408 also includes one or more low-noise amplifiers (LNAs) for receiving signals and one or more power amplifiers (PAs) for transmitting signals. The transceiver 406 or the RFFE 408 can include one or more phase shifters to delay a signal in time or change a phase thereof.

The communication unit 402 generates different patterns for the signal beams 416 by adjusting one or more beamforming parameters 418. The beamforming parameters 418 can also be referred to as weights. The beamforming parameters 418 establish different amplitudes 420, phases 422, and so forth for each signal version that is provided to one of the multiple antennas 412. By changing aspects of the signals emanating from the multiple antennas 412, the manners and geospatial locations at which the RF signals interact change, which produces different signal beam patterns.

Beamforming parameters 418 can be implemented at any portion of the communication unit 402. For example, the baseband part 404 can implement beamforming parameters 418 using precoding at a baseband processor. The transceiver 406 or the RFFE 408 can implement beamforming parameters 418 using, for instance, phase shifters to shift the phase of one signal version relative to that of other signal versions. Alternatively, a hybrid approach can be implemented in which beamforming parameters 418 are established partially at the baseband part 404 and partially at the transceiver 406 or the RFFE 408.

As shown in FIG. 4, the receiving device 426 also includes a communication unit (CU) 402. The receiving device 426 can therefore use the communication unit 402 to transmit or receive beamformed signals. Further, although the communication unit 402 of the transmitting device 424 is described above primarily in terms of transmitting a signal beam 416-1, each communication unit 402 can also receive signals using antenna beamforming. In other words, the inverse or reciprocal beamforming process can be implemented by the receiving device 426. To do so, the communication unit 402 at the receiving device 426 receives multiple RF signals or signal versions at multiple antennas 414 and processes the multiple RF signal versions using different beamforming parameters 418 until a received signal beam 416 is detected that has a sufficiently strong signal.

This process of searching for beamforming parameters 418 that are at least acceptable for receiving a signal beam 416 is called training the communication unit 402 to receive the signal beam 416 or training the beamformer. A beamforming training module 118 (of FIG. 1) of an end-user device 102 or a beamforming training module 128 (of FIG. 1) of a base station 104 can implement beamforming training. Because RF propagation is at least partially reciprocal in nature, the beamforming parameters 418 that are determined as part of a receive operation at the receiving device 426 can be used for transmission as well. In other words, beamforming parameters 418 that are good for receiving a signal beam 416 from one device can then be used for transmitting another signal beam 416 back to that device. Similarly, beamforming parameters 418 that have been confirmed as being good for transmitting can be used for receiving.

Thus, antenna beamforming during transmission to a given device can train the beamformer (e.g., by determining appropriate beamforming parameters 418) for subsequent reception from the given device, and antenna beamforming during reception from the given device can train the beamformer for subsequent transmission to the given device. Training a beamformer by receiving a communication on a signal beam to determine beamforming parameters 418 can therefore increase reception quality and accuracy and reduce latency, as well as reduce the occurrence of inefficient transmissions and receptions used solely for training. This is especially pertinent if the transmitting or receiving device is moving or the signal propagation channel is otherwise rapidly changing. Paging with enhanced beamforming as described herein can therefore be used to enhance beamforming by helping to train a beamformer as channel conditions change or as the location of at least one device that is party to a communication moves. For example, a beamformed signal received at a base station from a given end-user device helps to train the beamformer at the base station for sending a signal beam back to the given end-user device.

Example Schemes, Devices, and Components

Figure 5:
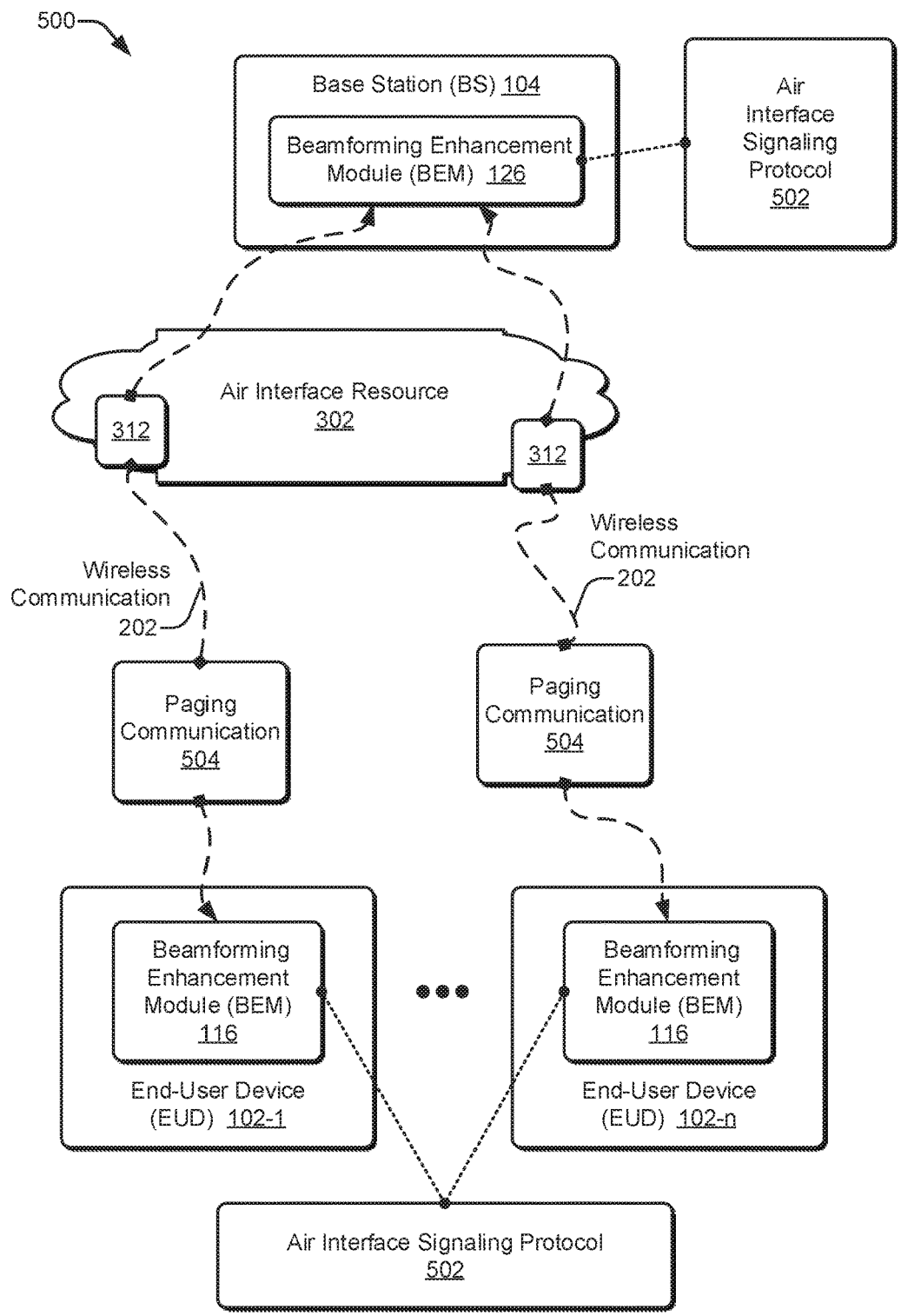
FIG. 5 illustrates an example environment in which paging with enhanced beamforming can be implemented using multiple paging communications in accordance with an air interface signaling protocol.

FIG. 5 illustrates an example environment 500 in which paging with enhanced beamforming can be implemented using multiple paging communications 504 in accordance with an air interface signaling protocol 502. As illustrated, a base station 104 includes a beamforming enhancement module 126, and multiple end-user devices 102-1 to 102-$n$ each include a beamforming enhancement module 116. In some implementations, both the beamforming enhancement module 116 and the beamforming enhancement module 126 operate in accordance with, or otherwise adhere to, the air interface signaling protocol 502. The air interface signaling protocol 502 specifies procedures, specifications, operating parameters, techniques, timings, and so forth that enable the end-user device 102 and the base station 104 to individually or jointly implement paging with enhanced beamforming as described herein. In an example operation, the multiple end-user devices 102-1 to 102-$n$ and the base station 104 exchange one or more paging communications 504 over at least one resource unit 312 (e.g., resource blocks 304 or resource elements 310) of the air interface resource 302 at least partially in accordance with the air interface signaling protocol 502. Each paging communication 504 is transmitted as at least one wireless communication 202, which may include an UL communication 202U or a DL communication 202D (of FIG. 2). The paging communications 504 are exchanged so that the base station 104 can notify an end-user device 102 that a page exists for that end-user device 102.

In example implementations, the air interface signaling protocol 502 enables a beamformer at the end-user device 102 or at the base station 104 to be trained with one or more paging communications 504. A paging communication 504 can comprise, for example, a paging message, a paging request, or a paging response, which are described herein below. Each of the beamforming enhancement modules 116 and 126 provides opportunities for a beamformer to learn appropriate beamforming parameters 418 (of FIG. 4) for transmitting a paging communication 504 to, or receiving one from, the other device using the beamforming training modules 118 and 128 (of FIG. 1), respectively. To do so, the beamforming enhancement module 116 is empowered to transmit a paging request from the end-user device 102 to the base station 104 via an UL communication 202U with a narrow beam. This provides the beamforming enhancement module 126 an opportunity to learn a position of the end-user device 102 or channel characteristics between the two devices. Thus, the beamforming enhancement module 126 is enabled to transmit a paging response from the base station 104 to the end-user device 102 via a DL communication 202D with another narrow beam using at least one learned beamforming parameter 418. An example progression of these different types of paging communications 504 is described below with reference to FIG. 6.

Figure 6:
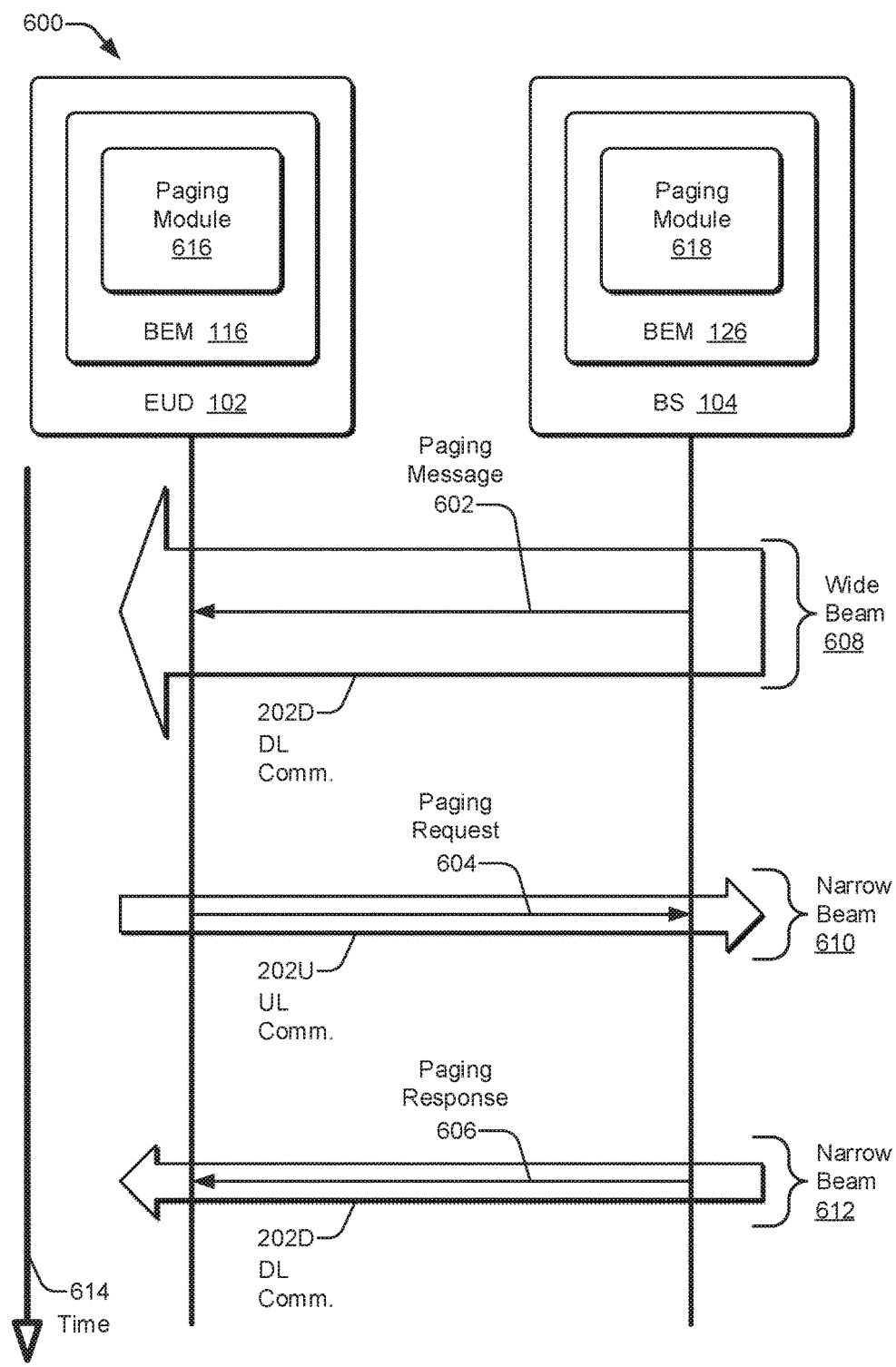
FIG. 6 is an example sequence diagram illustrating different paging communications between an end-user device and a base station to implement paging with enhanced beamforming.

FIG. 6 is an example sequence diagram 600 illustrating different paging communications between an end-user device 102 and a base station 104 to implement paging with enhanced beamforming. The beamforming enhancement module 116 of the end-user device 102 includes a paging module 616, and the beamforming enhancement module 126 of the base station 104 includes a paging module 618. The paging modules 616 and 618 are described below with reference to FIG. 7. As illustrated, time 614 increases in a downward direction for the sequence diagram 600. Three examples of the paging communication 504 (of FIG. 5) are shown: a paging message 602, a paging request 604, and a paging response 606.

In example implementations, the beamforming enhancement module 126 transmits the paging message 602 from the base station 104 to the end-user device 102 via a DL communication 202D with a wide beam 608. Although only one end-user device 102 is shown in FIG. 6, the base station 104 can transmit the paging message 602 to multiple end-user devices 102 using the wide beam 608, which is described below with reference to FIG. 8. The paging message 602 includes information to notify one or more end-user devices 102 whether a respective page exists at the base station 104 for each respective end-user device. A page can exist if, for example, there is information to transmit from the network to the respective end-user device. The page can be generated by the base station 104 or further upstream within the wireless network (e.g., at a mobility management entity (MME)). Example situations in which a page exists include if a mobile terminated call is attempting to be completed (e.g., for a circuit-switched (CS) or a packet-switched (PS) call), if an end-user device is being requested to reacquire system information, if an emergency warning indication is to be provided, and so forth. As explained further below with reference to FIG. 8, paging messages 602 are typically sent at determinable paging occasions.

If the end-user device 102 cannot obtain the paging message 602 at a particular paging occasion, the end-user device 102 is uncertain whether or not a page exists for the end-user device 102. Thus, the end-user device 102 can be missing a call or other downlink information. To address this possibility, the beamforming enhancement module 116 transmits a paging request 604 from the end-user device 102 to the base station 104 via an UL communication 202U with a narrow beam 610. The narrow beam 610 is intended to target the base station 104. The paging request 604 is configured to inquire whether a page exists for the end-user device 102.

The base station 104 receives the paging request 604 from the end-user device 102 via the UL communication 202U on the narrow beam 610. The beamforming enhancement module 126 processes the paging request 604 and produces a paging response 606. The paging response 606 is indicative of whether a page exists for the end-user device 102. The beamforming enhancement module 126 transmits the paging response 606 from the base station 104 to the requesting end-user device 102 via another DL communication 202D with a narrow beam 612. To do so, the beamforming enhancement module 126 can use at least one beamforming parameter 418 that was learned by receiving the paging request 604 via the UL communication 202U on the narrow beam 610. The beamforming enhancement module 116 receives the paging response 606 from the base station 104 via the DL communication 202D on the narrow beam 612. The beamforming enhancement module 116 can therefore learn if a page exists for the end-user device 102.

Figure 7:
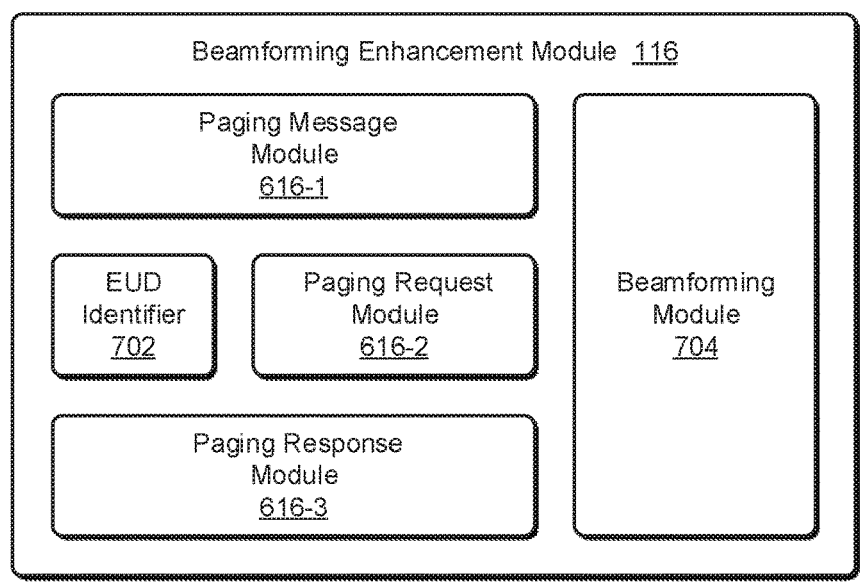
FIG. 7 illustrates an example beamforming enhancement module for an end-user device and an example beamforming enhancement module for a base station to individually or jointly implement paging with enhanced beamforming.
Figure 7:
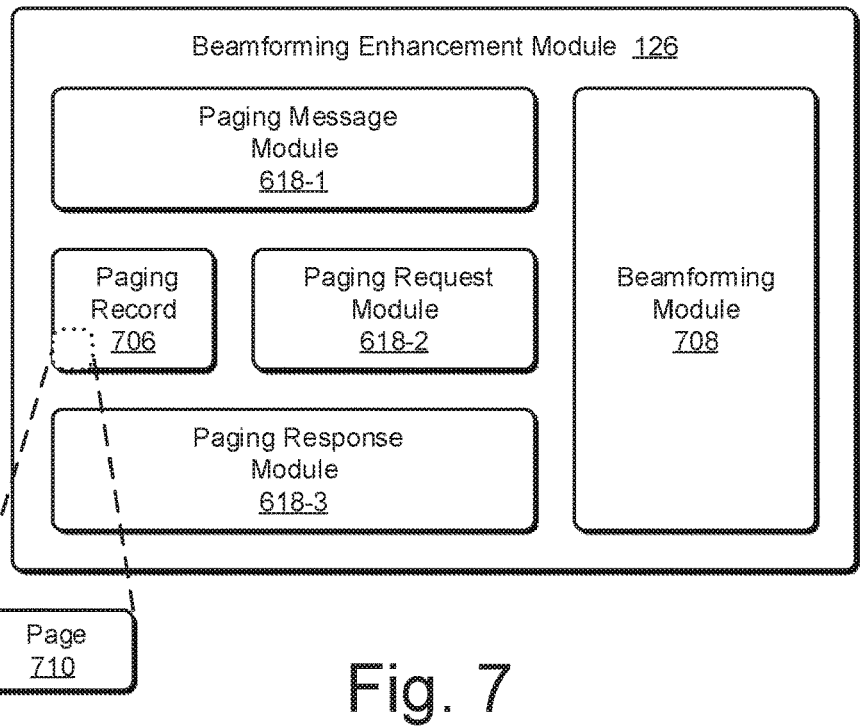

FIG. 7 illustrates generally at 700 an example beamforming enhancement module 116 for an end-user device and an example beamforming enhancement module 126 for a base station to individually or jointly implement paging with enhanced beamforming. The beamforming enhancement modules 116 and 126 can include one or more of the illustrated modules or information. Each individual module or set of information can include instructions or code that are stored in at least one computer-readable storage memory and that are executable by one or more processors. The modules can be distributed across different memories and/or executed by one processor or by multiple processors. Further, the instructions or code can be separated into additional modules or combined into fewer ones.

As illustrated for the end-user-device side, the beamforming enhancement module 116 includes at least one end-user device identifier 702, a beamforming module 704, and a paging module 616, which is separated into three modules. The paging module 616 includes a paging message module 616-1, a paging request module 616-2, and a paging response module 616-3. The end-user device identifier 702 is a locally or globally unique identification of the end-user device 102 with respect to at least a portion of a wireless network, such as for use by a base station 104. Examples of an end-user device identifier 702 include a phone number, an internet protocol (IP) address, a media access control (MAC) address, an International Mobile Subscriber Identity (IMSI) identifier, an International Mobile Equipment Identity (IMEI) identifier, a Cell Radio Network Temporary Identity (C-RNTI) identifier, a Globally Unique Temporary Identity (GUTI) identifier, and so forth.

The beamforming module 704 is configured to determine one or more beamforming parameters 418 to establish a signal beam 416 (both of FIG. 4). The beamforming module 704 can interact with the beamforming training module 118 of an end-user device 102 (of FIG. 1) responsive to a transmission or a reception of, e.g., at least one narrow beam wireless communication. The paging message module 616-1 is configured to perform operations described herein that pertain to a paging message 602 (e.g., of FIGS. 6 and 8). The paging request module 616-2 is configured to perform operations described herein that pertain to a paging request 604. The paging response module 616-3 is configured to perform operations described herein that pertain to a paging response 606. For example, a paging message module 616-1 can attempt to obtain a paging message 602, and a paging request module 616-2 can formulate and transmit a paging request 604 if no paging message 602 is obtained. Although not shown, the beamforming enhancement module 116 can include a timing module that tracks elapsed times for periods between consecutive paging occasions, that tracks a timer for a sleep period, and so forth.

As illustrated for the network side, the beamforming enhancement module 126 includes at least one paging record 706, a beamforming module 708, and a paging module 618, which is separated into three modules. The paging module 618 includes a paging message module 618-1, a paging request module 618-2, and a paging response module 618-3. The paging record 706 includes information for at least one page 710. Although not explicitly shown, an example page 710 can include, for example, an end-user device identifier 702 in association with paging information. Associated paging information can include a reason for an existence of the page 710 (e.g., mobile terminated call or emergency alert dissemination), a description of paging-related data—such as an originating number, an indication of how to accept the page 710, and so forth.

The beamforming module 708 is configured to determine one or more beamforming parameters 418 to establish a signal beam 416 (both of FIG. 4). The beamforming module 708 can interact with the beamforming training module 128 of a base station 104 (of FIG. 1) responsive to a transmission or a reception, e.g., of at least one narrow beam wireless communication. The paging message module 618-1 is configured to perform operations described herein that pertain to a paging message 602 (e.g., of FIGS. 6 and 8). The paging request module 618-2 is configured to perform operations described herein that pertain to a paging request 604. The paging response module 618-3 is configured to perform operations described herein that pertain to a paging response 606. For example, a paging request module 618-2 can receive a paging request 604 from an end-user device 102, and a paging response module 618-3 can formulate and transmit a paging response 606 to answer the requesting end-user device. Although not shown, the beamforming enhancement module 126 can include a timing module that tracks elapsed times for periods between consecutive paging occasions, that tracks periods for uplink and downlink regions of an air interface resource 302 (of FIG. 3), and so forth. Operations performed by an end-user device 102 and a base station 104, including by some of the modules depicted in FIG. 7, are described from both a spatial perspective and a temporal perspective in the context of paging occasions with reference to FIG. 8.

Figure 8:
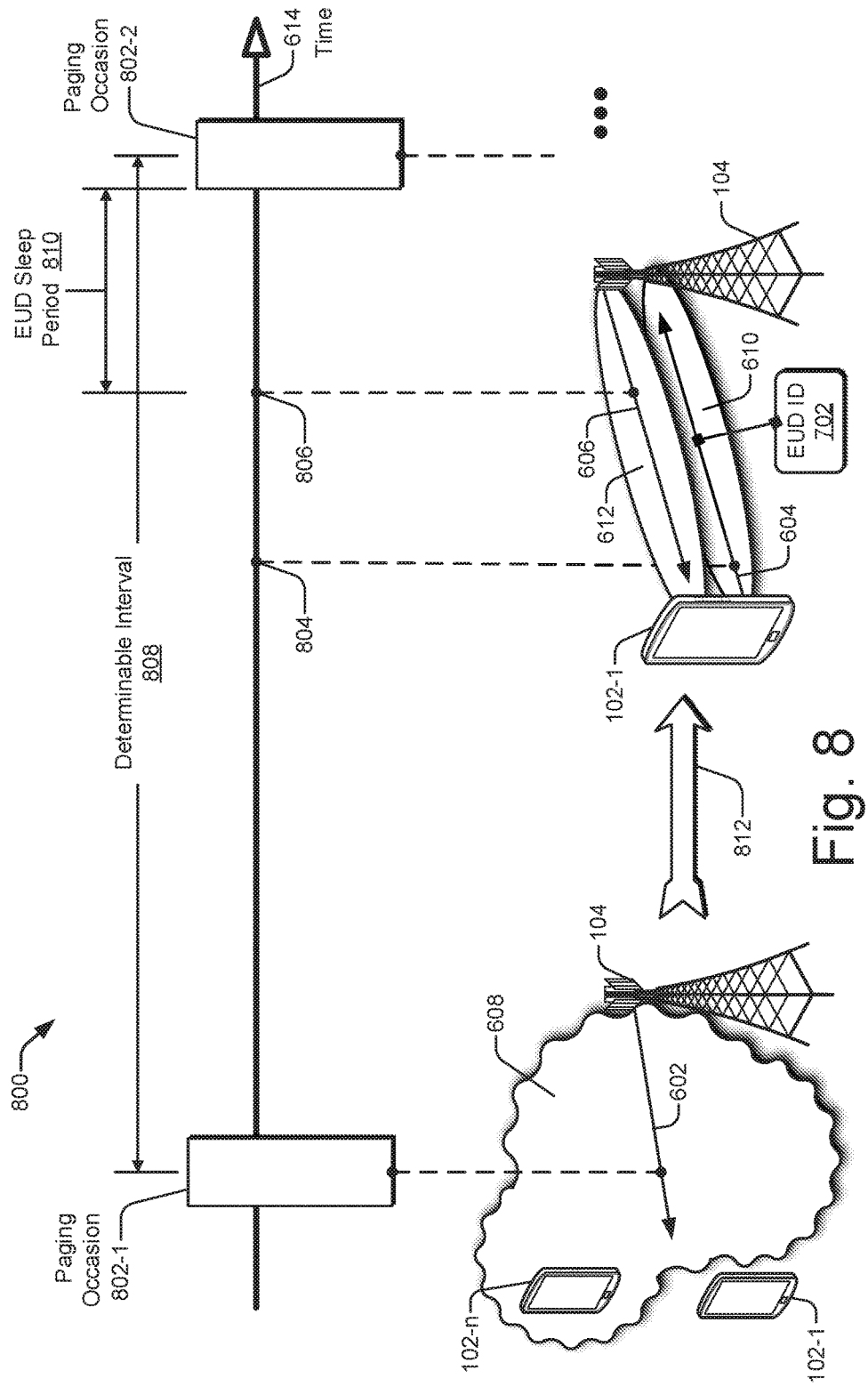
FIG. 8 illustrates an example scheme for implementing paging with enhanced beamforming with respect to two consecutive paging occasions.

FIG. 8 illustrates an example scheme 800 for implementing paging with enhanced beamforming with respect to two consecutive paging occasions 802. In FIG. 8, time 614 elapses in a rightward direction along an axis that indicates two consecutive paging occasions 802. The two consecutive paging occasions 802 are a first paging occasion 802-1 and a subsequent, second paging occasion 802-2. A determinable interval 808 extends between these two consecutive paging occasions 802. The multiple end-user devices 102-1 to 102-*n* and the base station 104 know or can calculate the determinable interval 808. In some implementations, the determinable interval 808 is constant or repeated such that the paging occasions 802 recur at regular or periodic intervals. In other implementations, the base station 104 can announce a pattern of upcoming determinable intervals 808 or a technique to calculate future determinable intervals 808.

In example implementations, paging occasions 802 and determinable intervals 808 are established so that an end-user device 102 is enabled to be in a low-power or sleep mode while still receiving notifications of pages. Thus, each end-user device 102 can awaken itself at each paging occasion 802 to attempt to obtain a paging message 602 and return to the sleep mode once a paging determination has been made.

In example operations, as shown in the lower left corner of FIG. 8, the base station 104 transmits a paging message 602 to multiple end-user devices 102-1 to 102-*n* using a wide beam 608 at the first paging occasion 802-1. With the wide beam 608, the base station 104 can transmit the paging message 602 to multiple end-user devices 102. However, all targeted or physically present end-user devices 102 may not be able to obtain the transmitted paging message 602. In the illustrated example, the end-user device 102-1 cannot obtain the transmitted paging message 602 due to, for example, distance, obstructions, poor reflections, physical orientation of the device, and so forth. Before the end-user device 102-1 can return to a sleep mode, the end-user device 102 makes one or more efforts to ascertain if a page exists for the device.

To investigate the paging situation, at a subsequent moment as represented by an arrow 812, the end-user device 102-1 transmits a paging request 604 to the base station 104 using a narrow beam 610. The narrow beam 610 is directed toward target the base station 104. The paging request 604 includes an end-user device identifier 702 and is configured to inquire whether a page exists for the end-user device 102-1. The base station 104 receives the paging request 604 from the end-user device 102-1 on the narrow beam 610. The base station 104 processes the paging request 604 and produces a paging response 606 based on the end-user device identifier 702. The paging response 606 is indicative of whether a page exists for the end-user device identifier 702. The base station 104 transmits the paging response 606 to the requesting end-user device 102-1 using a narrow beam 612. The base station 104 can transmit the paging response 606 such that the narrow beam 612 mirrors the narrow beam 610 by using the beamforming learned from the signal carrying the paging request 604. The end-user device 102-1 receives the paging response 606 from the base station 104 on the narrow beam 612.

The transmission of the paging request 604 corresponds to a time 804, and the transmission of the paging response 606 corresponds to a subsequent time 806. The occurrences of these times 804 and 806 can vary depending on which UL or DL communication region the transmission is performed in. These timings are described further below with reference to FIG. 9. At the time 806, the end-user device 102-1 has received the paging response 606. The end-user device 102-1 can therefore determine if a page 710 exists for the device. If so, the end-user device 102-1 can contact the base station 104 to accept the page 710. If not, the end-user device 102-1 can enter an end-user device (EUD) sleep period 810 until an occurrence of the second paging occasion 802-1, which is the next or consecutive paging occasion 802 with respect to the first paging occasion 802-1.

In the example scenario described above, the end-user device 102-1 successfully obtains (e.g., receives and decodes) the paging response 606. However, the end-user device 102-1 may fail to obtain the paging response 606. In such situations, the end-user device 102-1 can send a second (or a third, etc.) paging request 604 to try again to ascertain if a page 710 exists for the device. The second usage of a narrow beam 610 can be based on refinements learned by receiving the signal for the previous paging response 606 on the narrow beam 612. Thus, repeated exchanges of paging requests and responses can refine beamforming parameters until a paging response 606 is successfully decoded by the end-user device 102-1. After a paging response 606 is successfully decoded, or after some number of failed attempts, the end-user device 102-1 can enter the end-user device sleep period 810 until the next paging occasion 802. Although certain drawings (e.g., FIG. 8) are described herein in terms of an end-user device 102 that is in or that is returning to a low-power or a sleep mode, the principles described herein are also applicable to scenarios in which the end-user device 102 is awake and not entering a sleep mode.

Figure 9:
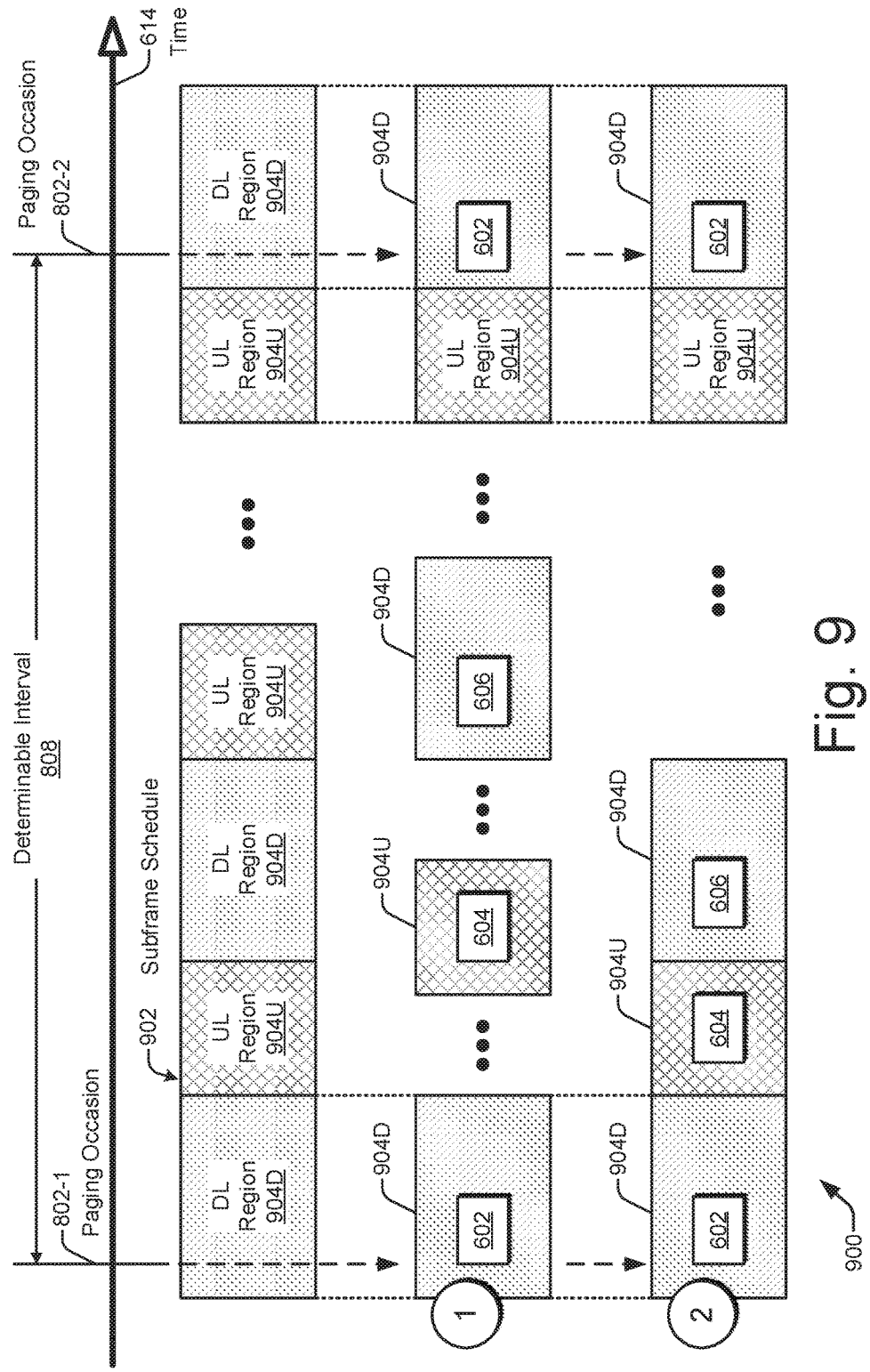
FIG. 9 illustrates, for a portion of an air interface resource, two example paging communication exchanges with different timings.

FIG. 9 illustrates generally at 900, for a portion of an air interface resource, two example paging-communication exchanges with different timings. The representation of the air interface resource includes a subframe schedule 902 and two allocation rows below the subframe schedule 902. The example subframe schedule 902 depicts multiple alternating regions 904 indicative of how the air interface resource can be allocated over time for each frequency range or row. These alternating regions include a DL region 904D and an UL region 904U. The DL regions 904D are shaded with a dotted pattern, and the UL regions 904U are shaded with a cross-hatched pattern. These shading patterns are carried downward into the two rows depicting example timings of the paging-communication exchanges. These two rows are each indicated with an encircled numeral (1) or (2). Thus, each of the regions across the first and second rows (1) and (2) has a pattern indicative of being assigned to the uplink "UL" versus being assigned to the downlink "DL." Along an axis for elapsing time 614, a first paging occasion 802-1 and a consecutive second paging occasion 802-2 are indicated. Each paging occasion 802 corresponds to a DL region 904D in which a base station 104 can transmit a paging message 602 to multiple end-user devices 102-1 to 102-*n*.

In the first example timing row (1) (i.e., the middle row), the base station transmits a paging message 602 to multiple end-user devices in a DL region 904D using a wide beam responsive to an occurrence of the first paging occasion 802-1. As indicated by the depicted ellipses (" . . . "), at some subsequent time, a requesting end-user device transmits a paging request 604 to the base station in an UL region 904U using a narrow beam. Similarly, after another period of time, the base station transmits a paging response 606 back to the requesting end-user device in a DL region 904D using another narrow beam. After yet another period of time along the first example timing row (1), the base station transmits another paging message 602 to the multiple end-user devices in another DL region 904D using a wide beam responsive to an occurrence of the second paging occasion 802-2.

As represented by the ellipses, any amount of time or regions 904 can occur between the explicitly-indicated regions of the first example timing row (1). Examples of such regions that may occur range from zero intervening regions to multiple intervening regions of both UL and DL types. However, in certain example implementations, the paging request 604 and the paging response 606 are transmitted and received before the second paging occasion 802-2. In other words, an end-user device can initiate a paging-communication exchange that includes a request and a response such that at least the paging request 604 is transmitted before the next succeeding paging occasion 802 or such that both the paging request 604 and the corresponding paging response 606 are received and processed between two consecutive paging occasions 802. This approach provides a relatively relaxed timing of signal transmissions and receptions, but the end-user device consequently stays awake longer or has to undergo multiple sleep and wake cycles.

To reduce an amount of time that an end-user device is awake or how often the end-user device reawakens itself, the second example timing row (2) (i.e., the lower row) can be implemented. Here, the base station also transmits a paging message 602 to multiple end-user devices in a DL region 904D using a wide beam responsive to the first paging occasion 802-1. In the next UL region 904U, the end-user device transmits a paging request 604 to the base station using a narrow beam. Similarly, in the next succeeding DL region 904D, the base station transmits a paging response 606 back to the requesting end-user device using another narrow beam. In such cases, there is no intervening region 904 between any two DL/UL or UL/DL communication pairs. As shown in the second example timing row (2), each region 904 is adjacent to the preceding region having a paging communication that is part of the same paging-communication exchange. As used in this context, two regions 904 for a given paging-communication exchange may be adjacent to each other if no region 904 is present between the two adjacent regions 904, even if guard time or buffer resource units are present between the two.

Utilizing regions that are adjacent to each other provides a number of potential advantages. First, power can be saved at the end-user device. Second, if a page does exist for the end-user device, the end-user device obtains notice thereof faster than if additional time elapses or regions occur. Third, unilateral or bilateral beamforming training can be faster or more accurate by exchanging wireless communications in rapid succession. Fourth, by sending a paging request 604 sooner rather than later (e.g., at a next UL region 904U), more time remains available after a paging response 606 is transmitted. Consequently, if an end-user device 102 fails to obtain a first paging response 606, the end-user device 102 may have time to send another paging request 604 and receive a second paging response 606 before the next paging occasion 802.

Having generally described schemes and apparatuses for paging with enhanced beamforming, this discussion now turns to example methods.

Example Methods

Example methods are described below with reference to various flow diagrams of FIGS. 10, 11, and 12. These methods relate to paging with enhanced beamforming at a system level, a base station level, and an end-user device level, respectively. Aspects of these methods may be implemented in, for example, hardware (e.g., fixed logic circuitry or general-purpose processors), firmware, or some combination thereof. These techniques may be realized using one or more of the electronic devices or components shown in FIG. 1-9 or 13 (an electronic device 1300 is described in FIG. 13 below), which devices or components may be further divided, combined, and so on. The electronic devices and components of these figures generally represent firmware, hardware, IC chips, circuits, or a combination thereof. Thus, these figures illustrate some of the many possible systems or apparatuses capable of implementing the described techniques.

For these flow diagrams, the orders in which operations are shown and/or described are not intended to be construed as a limitation. Any number or combination of the described method operations can be combined in any order to implement a method, or an alternative method. Further, described operations can be implemented in fully or partially overlapping manners.

Figure 10:
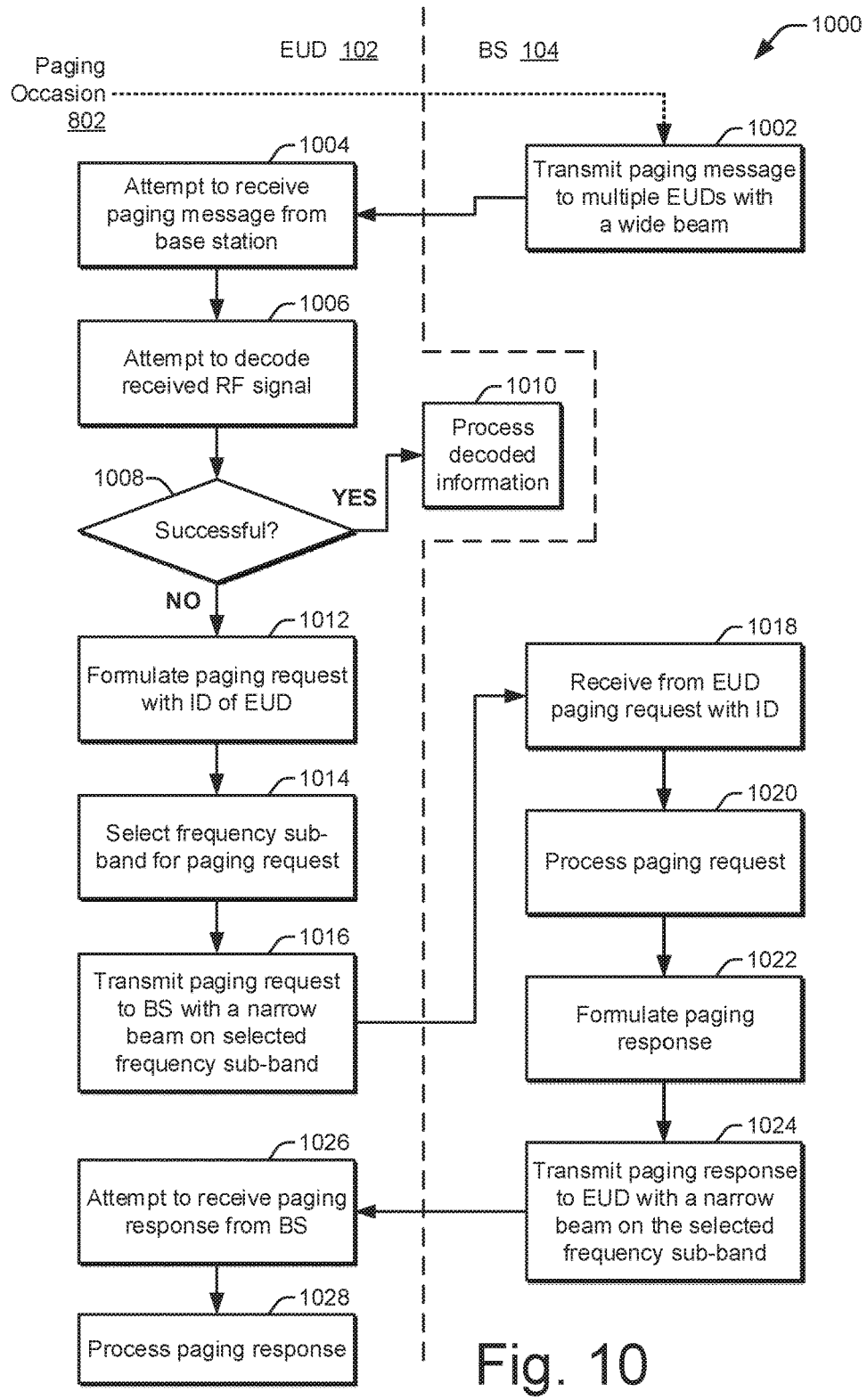
FIG. 10 illustrates example methods for a portion of a wireless system to implement paging with enhanced beamforming.

FIG. 10 illustrates at a flow diagram 1000 example methods for implementing paging with enhanced beamforming using a portion of a wireless system. The flow diagram 1000 includes fourteen operations 1002-1028. A base station 104 performs the operations 1002 and 1018-1024. An end-user device 102 performs the operations 1004-1016, 1026, and 1028. An occurrence of a paging occasion 802 initiates the process.

At 1002, responsive to the paging occasion 802, the base station 104 transmits a paging message 602 to multiple end-user devices 102-1 to 102-n with a wide beam 608. Alternatively, the base station 104 can transmit the paging message 602 to a particular end-user device 102 with a narrow beam using old, and potentially stale, beamforming parameters 418 for the particular end-user device 102. The end-user device 102 attempts to obtain a paging message 602 at the paging occasion 802. To obtain a paging message, an end-user device receives and successfully decodes information contained within the paging message. Thus, at 1004, the end-user device 102 attempts to receive the paging message 602 sent from the base station 104 by receiving some RF signal. Further, at 1006, the end-user device 102 attempts to decode the paging information in the received RF signal.

At 1008, the end-user device 102 determines if the decoding was successful. If so, then at 1010, the end-user device 102 processes the decoded information and can accept a waiting page 710 or return to a sleep mode if no page 710 is waiting. On the other hand, if the decoding was unsuccessful, then at 1012, the end-user device 102 formulates a paging request 604 with an end-user device identifier 702. At 1014, the end-user device 102 selects a frequency sub-band for the paging request. At 1016, the end-user device 102 transmits the paging request 604 to the base station 104 via an UL communication 202U with a narrow beam 610 on the selected frequency sub-band. This UL communication 202U can be autonomous and without a resource grant by the base station 104.

At 1018, the base station 104 receives on the selected frequency sub-band the paging request 604, which includes the end-user device identifier 702. The paging request 604 is received from the end-user device 102 via the UL communication 202U with the narrow beam 610. At 1020, the base station 104 processes the paging request 604. For example, the base station 104 can determine if any waiting pages 710 match the end-user device identifier 702. At 1022, the base station 104 formulates a paging response 606 based on the processing. For example, the paging response 606 can indicate that a page 710 is waiting for the end-user device 102 or is that no page 710 is waiting for the end-user device 102.

At 1024, the base station 104 transmits the formulated paging response 606 to the end-user device 102 via a DL communication 202D using a narrow beam 612 on the selected frequency sub-band. At 1026, the end-user device 102 attempts to receive the paging response 606 from the base station 104 on the narrow beam 612. At 1028, the end-user device 102 processes the paging response 606. Further processing can include accepting a waiting page 710, going to sleep if no page 710 is waiting, sending another paging request 604 if no paging response 606 was successfully obtained, and so forth.

Figure 11:
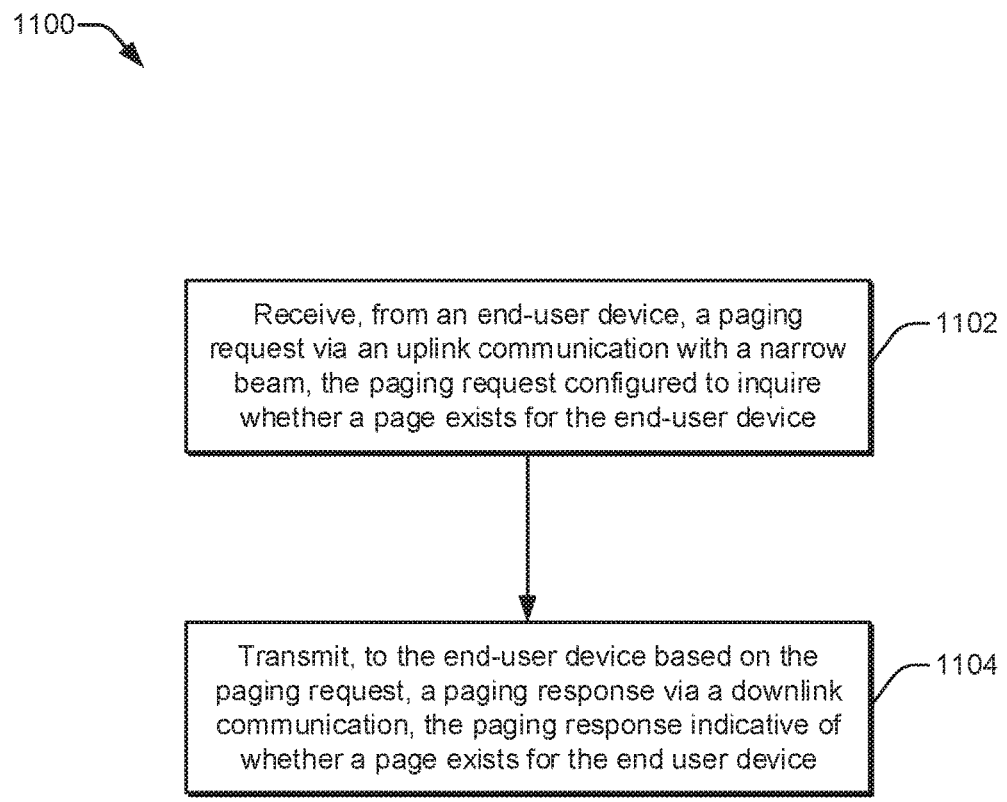
FIG. 11 illustrates example methods for a base station to implement paging with enhanced beamforming.

FIG. 11 illustrates at a flow diagram 1100 example methods for implementing paging with enhanced beamforming using a base station 104. The flow diagram 1100 includes two operations 1102 and 1104. At 1102, a paging request is received from an end-user device via an uplink communication with a narrow beam. The paging request is configured to inquire whether a page exists for the end-user device. For example, a beamforming enhancement module 126 of a base station 104 can receive, from an end-user device 102, a paging request 604 via an uplink communication 202U with a narrow beam 610. The paging request 604 is configured to inquire whether a page 710 exists for the end-user device 104 in a paging record 704 of the base station 104.

At 1104, a paging response is transmitted, via a downlink communication, to the end-user device based on the paging request, with the paging response indicative of whether a page exists for the end-user device. For example, the beamforming enhancement module 126 can transmit, based on the paging request 604, a paging response 606 to the end-user device 102 via a downlink communication 202D. The paging response 606 is indicative of whether a page 710 exists for the end-user device 102 at the base station 104 and thus whether the end-user device 102 failed to obtain an earlier-transmitted paging message 602.

Figure 12:
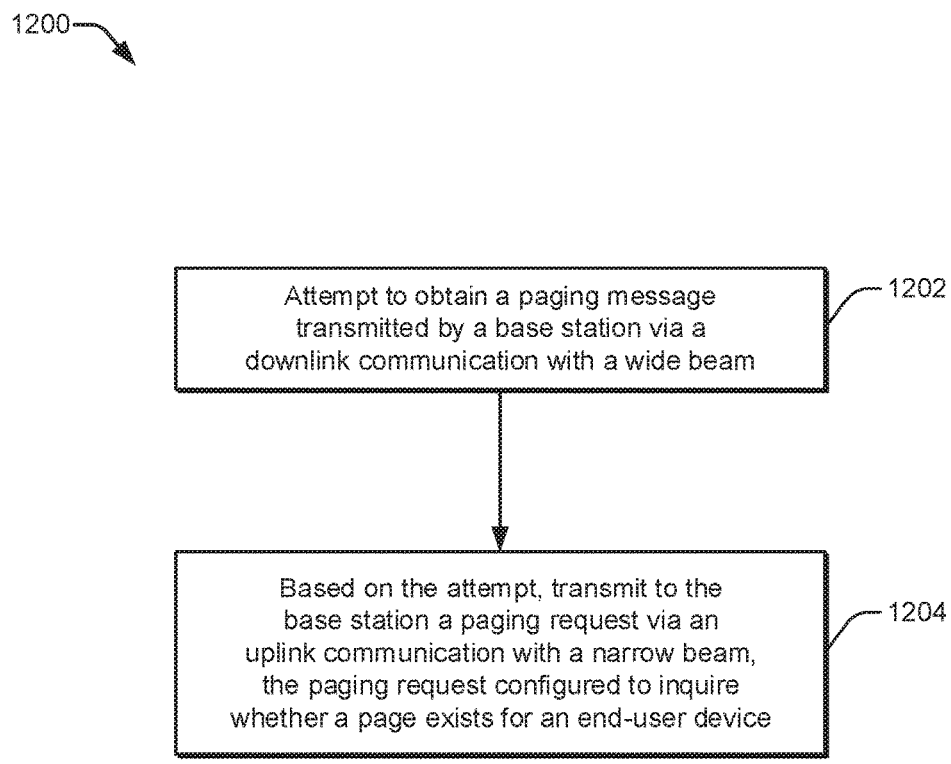
FIG. 12 illustrates example methods for an end-user device to implement paging with enhanced beamforming.

FIG. 12 illustrates at a flow diagram 1200 example methods for implementing paging with enhanced beamforming using an end-user device 102. The flow diagram 1200 includes two operations 1202 and 1204. At 1202, a paging message that is transmitted by a base station via a downlink communication with a wide beam is attempted to be obtained. For example, a beamforming enhancement module 116 of an end-user device 102 can attempt to obtain a paging message 602 that is transmitted by a base station 104 via a downlink communication 202D with a wide beam 608.

At 1204, based on the attempt to obtain the paging message, a paging request is transmitted to the base station via an uplink communication with a narrow beam. The paging request is configured to inquire whether a page exists for the end-user device. For example, based on a failed attempt to obtain the paging message 602, the beamforming enhancement module 116 can transmit to the base station 104 a paging request 604 via an uplink communication 202U with a narrow beam 610. The paging request 604 is configured to inquire whether a page 710 exists for the end-user device 102 so that a paging module 616 can accept the page 710 or return to a sleep mode until another paging occasion 802.

Example Electronic Device

Figure 13:
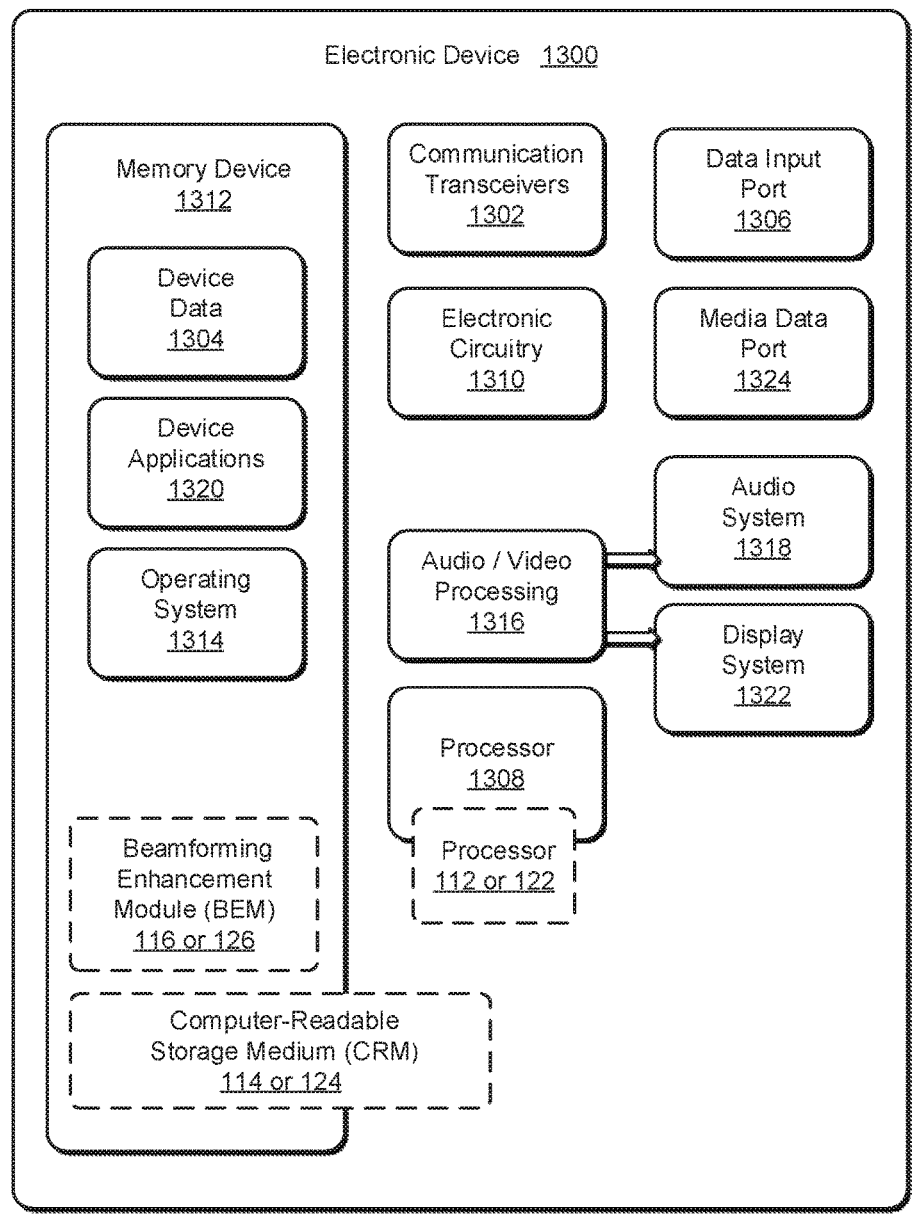
FIG. 13 illustrates various components of an example electronic device that can implement paging with enhanced beamforming in accordance with one or more implementations.

FIG. 13 illustrates various components of an example electronic device 1300 that can implement paging with enhanced beamforming in accordance with one or more implementations as described with reference to any of the previous FIGS. 1-12. The electronic device 1300 may be implemented as any one or combination of a fixed or mobile device, in any form of a consumer, computer, portable, user, server, communication, phone, navigation, gaming, audio, camera, messaging, media playback, and/or other type of electronic device or a base station device, including a cellular base station or a Wi-Fi access point.

Electronic device 1300 includes communication transceivers 1302 that enable wired and/or wireless communication of device data 1304, such as received data, transmitted data, or other information as described above. Example communication transceivers 1302 include NFC transceivers, WPAN radios compliant with various IEEE 802.15 (Bluetooth™) standards, WLAN radios compliant with any of the various IEEE 802.11 (WiFi™) standards, WWAN (3GPP-compliant) radios for cellular telephony, wireless metropolitan area network (WMAN) radios compliant with various IEEE 802.16 (WiMAX™) standards, and wired local area network (LAN) Ethernet transceivers.

The electronic device 1300 may also include one or more data input ports 1306 via which any type of data, media content, and/or other inputs can be received, such as user-selectable inputs, messages, applications, music, television content, recorded video content, and any other type of audio, video, and/or image data received from any content and/or data source. The data input ports 1306 may include USB ports, coaxial cable ports, and other serial or parallel connectors (including internal connectors) for flash memory, DVDs, CDs, and the like. These data input ports 1306 may be used to couple the electronic device to components, peripherals, or accessories such as keyboards, microphones, or cameras.

The electronic device 1300 of this example includes at least one processor 1308 (e.g., any one or more of application processors, microprocessors, digital-signal processors (DSPs), controllers, and the like), which can include a combined processor and memory system (e.g., implemented as part of an SoC), that processes (e.g., executes) computer-executable instructions stored on computer-readable media to control operation of the device. The processor 1308 may be implemented as an application processor, embedded controller, microcontroller, SoC, and the like. Generally, a processor or processing system may be implemented at least partially in hardware, which can include components of an integrated circuit or on-chip system, a digital-signal processor (DSP), an application-specific integrated circuit (ASIC), a field-programmable gate array (FPGA), a complex programmable logic device (CPLD), and other implementations in silicon and/or other hardware.

Alternatively or additionally, the electronic device 1300 can be implemented with any one or combination of electronic circuitry, which may include software, hardware, firmware, or fixed logic circuitry that is implemented in connection with processing and control circuits, which are generally indicated at 1310 (as electronic circuitry 1310). This electronic circuitry 1310 can implement executable or hardware-based modules (not shown) through logic circuitry and/or hardware (e.g., such as an FPGA), and so forth.

Although not shown, the electronic device 1300 can include a system bus, interconnect, crossbar, or data transfer system that couples the various components within the device. A system bus or interconnect can include any one or combination of different bus structures, such as a memory bus or memory controller, a peripheral bus, a universal serial bus, and/or a processor or local bus that utilizes any of a variety of bus architectures.

The electronic device 1300 also includes one or more memory devices 1312 that enable data storage, examples of which include random access memory (RAM), non-volatile memory (e.g., read-only memory (ROM), flash memory, EPROM, and EEPROM), and a disk storage device. The memory device(s) 1312 provide data storage mechanisms to store the device data 1304, other types of code and/or data, and various device applications 1320 (e.g., software applications or programs). For example, an operating system 1314 can be maintained as software instructions within the memory device 1312 and executed by the processor 1308.

As shown, the electronic device 1300 also includes an audio and/or video processing system 1316 that processes audio data and/or passes through the audio and video data to an audio system 1318 and/or to a display system 1322 (e.g., a video buffer or a screen of a smart phone or camera). The audio system 1318 and/or the display system 1322 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1324. In some implementations, the audio system 1318 and/or the display system 1322 are external or separate components of the electronic device 1300. Alternatively, the display system 1322 can be an integrated component of the example electronic device 1300, such as part of an integrated touch interface.

The electronic device 1300 of FIG. 13 is an example implementation of the devices 102, 104, 424, and 426 of, e.g., FIGS. 1-4 et. seq. Thus, the processor 1308 is an example of the processor 112 or 122. Also, the memory device 1312 is an example of the computer-readable storage medium 114 or 124, as further indicated by the illustrated beamforming enhancement module 116 or 126. The electronic device 1300 may further include, e.g. as part of a communication unit 120, 130, or 402 (of FIGS. 1 and 4), at least one antenna, at least one transceiver, at least one amplifier, at least one baseband processor, and so forth. Thus, the principles of paging with enhanced beamforming as described herein can be implemented by, or in conjunction with, the electronic device 1300 of FIG. 13.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, items represented in the accompanying figures and terms discussed herein may be indicative of one or more items or terms, and thus reference may be made interchangeably to single or plural forms of the items and terms in this written description. Although implementations for paging with enhanced beamforming have been described in language specific to certain features and/or methods, the subject of the appended claims is not necessarily limited to the specific features or methods described. Rather, the specific features and methods are disclosed as example implementations for paging with enhanced beamforming.

What is claimed is:

1. A method performed by an end-user device to implement paging with enhanced beamforming, the method comprising:
attempting to obtain a paging message transmitted by a base station via a downlink communication with a wide beam; and
based on the attempting, transmitting, to the base station, a paging request via an uplink communication with a narrow beam, the paging request configured to inquire whether a page exists for the end-user device.

2. The method of claim 1, wherein the attempting to obtain comprises attempting to receive the paging message from the downlink communication with the wide beam.

3. The method of claim 2, wherein:
the attempting to receive the paging message is performed responsive to a paging occasion; and
the transmitting the paging request is performed prior to a next paging occasion.

4. The method of claim 2, wherein the attempting to obtain comprises attempting to decode the received paging message to determine whether a page exists for the end-user device.

5. The method of claim 1, wherein the transmitting the paging request comprises:
formulating the paging request to include an identifier of the end-user device; and
selecting a frequency sub-band for the uplink communication.

6. The method of claim 5, further comprising:
receiving, from the base station, a paging response via another downlink communication with another narrow beam, the paging response indicative of whether a page exists for the end-user device.

7. The method of claim 6, wherein the receiving the paging response comprises receiving the paging response on the selected frequency sub-band, the other narrow beam of the other downlink communication having a direction that corresponds to that of the narrow beam of the uplink communication.

8. The method of claim 1, wherein:
the attempting to obtain the paging message is performed during a given downlink region of an air interface resource; and
the transmitting the paging request is performed during an uplink region of the air interface resource that is after the downlink region.

9. The method of claim 8, wherein the uplink region and the downlink region are adjacent to each other.

10. The method of claim 1, wherein the transmitting the paging request to the base station is performed based on a failure to obtain the paging message as a result of the attempting.

11. The method of claim 1, further comprising:
responsive to not successfully obtaining a paging response after the transmitting of the paging request, transmitting, to the base station, another paging request via another uplink communication with another narrow beam, the other paging request configured to inquire again whether a page exists for the end-user device.

12. An end-user device comprising:
at least one antenna;
at least one communication unit coupled to the at least one antenna; and
a processor and memory system, operatively coupled to the at least one communication unit, implementing a beamforming enhancement module configured to:
attempt to obtain a paging message transmitted by a base station via a downlink communication with a wide beam; and based on the attempt, transmit a paging request to the base station via an uplink communication with a narrow beam, the paging request configured to inquire whether a page exists for the end-user device.

13. The end-user device of claim 12, wherein the attempt to obtain the paging message comprises at least one of:
   an attempt to receive the paging message from the downlink communication with the wide beam using the at least one antenna; or
   an attempt to decode the received paging message to determine whether a page exists for the end-user device.

14. The end-user device of claim 12, wherein the beamforming enhancement module is configured to:
   transmit the paging request to the base station responsive to a failure to obtain the paging message.

15. The end-user device of claim 12, wherein the beamforming enhancement module is configured to:
   receive a paging response from the base station via another downlink communication with another narrow beam, the paging response indicative of whether a page is waiting or a page is not waiting for the end-user device.

16. The end-user device of claim 12, wherein the end-user device comprises a smart phone.

17. An end-user device for implementing paging with enhanced beamforming in a wireless system, the end-user device comprising:
   at least one antenna;
   at least one communication unit coupled to the at least one antenna; and
   a processor and memory system, operatively coupled to the at least one communication unit, including:
   means for attempting to obtain a paging message transmitted by a base station via a downlink communication with a wide beam; and
   means for transmitting a paging request to the base station via an uplink communication with a narrow beam, the paging request configured to inquire whether a page exists for the end-user device, the means for transmitting operative responsive to the means for attempting.

18. The end-user device of claim 17, wherein:
   the means for attempting is configured to attempt to obtain respective paging messages at respective paging occasions; and
   the means for transmitting is configured to transmit respective paging requests between the respective paging occasions and respective consecutive subsequent paging occasions responsive to respective failures to obtain the respective paging messages at the respective paging occasions.

19. The end-user device of claim 17, wherein the processor and memory system include:
   means for receiving a paging response from the base station via another downlink communication with another narrow beam, the paging response indicative of whether a page exists for the end-user device.

20. The end-user device of claim 19, wherein:
   at least a portion of the processor and memory system is integrated with the at least one communication unit;
   the processor and memory system stores an identifier of the end-user device;
   the paging request includes the identifier; and
   the uplink communication and the other downlink communication correspond to a same frequency sub-band.

* * * * *